United States Patent
Sano et al.

(10) Patent No.: US 11,601,628 B2
(45) Date of Patent: Mar. 7, 2023

(54) CONTROL METHOD OF SPECTROSCOPIC IMAGING DEVICE, SPECTROSCOPIC IMAGING DEVICE, COMPUTER PROGRAM, CONTROL METHOD OF DISPLAY SYSTEM, CONTROL METHOD OF PROJECTOR, DISPLAY SYSTEM, AND PROJECTOR

(71) Applicant: SEIKO EPSON CORPORATION, Tokyo (JP)

(72) Inventors: Akira Sano, Matsumoto (JP); Shinji Kubota, Ina (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/329,782

(22) Filed: May 25, 2021

(65) Prior Publication Data
US 2021/0377502 A1   Dec. 2, 2021

(30) Foreign Application Priority Data

May 28, 2020 (JP) .............................. JP2020-093023
Dec. 22, 2020 (JP) .............................. JP2020-212187
Feb. 15, 2021 (JP) .............................. JP2021-021505

(51) Int. Cl.
*H04N 9/31* (2006.01)
*G01J 3/28* (2006.01)

(52) U.S. Cl.
CPC .......... *H04N 9/3194* (2013.01); *G01J 3/2823* (2013.01); *H04N 9/3158* (2013.01); *H04N 9/3182* (2013.01)

(58) Field of Classification Search
CPC ............... H04N 9/3194; H04N 9/3182; H04N 5/74–7475; H04N 9/31–3141;
(Continued)

(56) References Cited

U.S. PATENT DOCUMENTS 5,528,368 A * 6/1996 Lewis .................... G01J 3/2823
                                             250/339.02
9,025,024 B2 * 5/2015 Xu ......................... G06V 10/143
                                             348/145
(Continued)

FOREIGN PATENT DOCUMENTS

JP   2001153795 A   6/2001
JP   2005020581 A   1/2005
(Continued)

*Primary Examiner* — John W Miller
*Assistant Examiner* — Humam M Satti
(74) *Attorney, Agent, or Firm* — Chip Law Group

(57) ABSTRACT

A control method of a spectroscopic imaging device including an imaging element and a spectral element, the control method includes causing the spectroscopic imaging device to generate a first measurement spectrum consisting of N1 wavelengths by imaging a target object by making output wavelengths of a spectral element different when the spectroscopic imaging device is in a high accuracy mode and causing the spectroscopic imaging device to generate a second measurement spectrum consisting of N2 wavelengths by imaging the target object by making the output wavelengths of the spectral element different when the spectroscopic imaging device is in a high speed mode, in which N1 is an integer greater than or equal to two, and N2 is an integer less than N1.

13 Claims, 12 Drawing Sheets

| OPERATION MODE | NUMBER OF MEASUREMENT WAVELENGTHS | EXPOSURE TIME | MEASUREMENT TIME |
|---|---|---|---|
| HIGH ACCURACY MODE M1 | 31 (400 TO 700 nm, 10 nm INTERVAL) | 60msec(15fps) | 2.07 SECOND |
| HIGH SPEED MODE M2 | 8 (400 TO 680 nm, 40 nm INTERVAL) | 60msec(15fps) | 0.53 SECOND |
| OPTIMUM MODE M3 | 16 (400 TO 600 nm, 40 nm INTERVAL) (600 TO 700 nm, 10 nm INTERVAL) | 60msec(15fps) | 1.06 SECOND |

(58) Field of Classification Search
CPC .......... H04N 9/3147–3197; H04N 2201/0438; G01J 3/506; G01J 1/0488; G01J 3/2823; G01J 2003/2826; G06T 3/005; G03B 21/00–32; G03B 21/56; G03B 21/567; G03B 27/68
See application file for complete search history.

(56) References Cited

U.S. PATENT DOCUMENTS

| | | | |
|---|---|---|---|
| 2007/0097213 A1 | 5/2007 | Ajito | |
| 2011/0007283 A1* | 1/2011 | Tanaka | G03B 21/147 353/70 |
| 2011/0026035 A1 | 2/2011 | Muto et al. | |
| 2012/0050698 A1* | 3/2012 | Kotani | H04N 9/3147 353/94 |
| 2012/0293803 A1* | 11/2012 | Arai | G01J 3/2823 356/416 |
| 2015/0185081 A1* | 7/2015 | Sano | G01J 3/0235 356/456 |
| 2015/0288893 A1* | 10/2015 | Kane | G01J 3/10 348/164 |
| 2016/0138974 A1* | 5/2016 | Silny | G01J 3/04 356/326 |
| 2017/0064222 A1* | 3/2017 | Nakamura | H04N 9/04557 |
| 2018/0204863 A1* | 7/2018 | Tack | G01J 3/36 |
| 2018/0224332 A1* | 8/2018 | Ooi | G01J 3/26 |
| 2018/0270418 A1* | 9/2018 | Lin | G02B 5/281 |
| 2019/0363116 A1* | 11/2019 | Raz | G02B 5/284 |
| 2020/0077058 A1* | 3/2020 | Matsumoto | H04N 9/3158 |
| 2020/0264049 A1* | 8/2020 | Raz | G02B 26/001 |

FOREIGN PATENT DOCUMENTS

| | | |
|---|---|---|
| JP | 2007218860 A | 8/2007 |
| JP | 2011024842 A | 2/2011 |
| JP | 2018054448 A | 4/2018 |

* cited by examiner

| OPERATION MODE | NUMBER OF MEASUREMENT WAVELENGTHS | EXPOSURE TIME | MEASUREMENT TIME |
|---|---|---|---|
| HIGH ACCURACY MODE M1 | 31 (400 TO 700 nm, 10 nm INTERVAL) | 60msec(15fps) | 2.07 SECOND |
| HIGH SPEED MODE M2 | 8 (400 TO 680 nm, 40 nm INTERVAL) | 60msec(15fps) | 0.53 SECOND |
| OPTIMUM MODE M3 | 16 (400 TO 600 nm, 40 nm INTERVAL) (600 TO 700 nm, 10 nm INTERVAL) | 60msec(15fps) | 1.06 SECOND |

| OPERATION MODE | NUMBER OF MEASUREMENT WAVELENGTHS | EXPOSURE TIME | MEASUREMENT TIME |
|---|---|---|---|
| HIGH ACCURACY MODE | 31 (400 TO 700 nm, 10 nm INTERVAL) | 60msec(15fps) | 2.07 SECOND |
| HIGH SPEED MODE | 8 (400 TO 680 nm, 40 nm INTERVAL) | 60msec(15fps) | 0.53 SECOND |

CONTROL METHOD OF SPECTROSCOPIC IMAGING DEVICE, SPECTROSCOPIC IMAGING DEVICE, COMPUTER PROGRAM, CONTROL METHOD OF DISPLAY SYSTEM, CONTROL METHOD OF PROJECTOR, DISPLAY SYSTEM, AND PROJECTOR

The present application is based on, and claims priority from JP Application Serial Number 2020-093023, filed May 28, 2020, JP Application Serial Number 2020-212187, filed Dec. 22, 2020, and JP Application Serial Number 2021-021505, filed Feb. 15, 2021, the disclosures of which are hereby incorporated by reference herein in their entirety.

BACKGROUND

1. Technical Field

The present disclosure relates to a control method of a spectroscopic imaging device, a spectroscopic imaging device, a computer program, a control method of a display system, a control method of a projector, a display system, and a projector.

2. Related Art

For example, JP-A-2011-24842 discloses a technique of capturing an image of an object to be inspected and correcting the image based on the imaging result. Further, JP-A-2005-20581 describes that a projected image of a projector is sequentially imaged while switching filters of the bands corresponding to each of a plurality of primary colors, and correction data is calculated based on the imaging result. With these techniques, the more images in different wavelength ranges are captured, the easier it is to obtain high accuracy correction data, but the longer the time required for imaging. Particularly, in the case of a spectroscopic imaging device (it is also referred to as a spectroscopic camera), it is necessary to ensure a predetermined exposure time in order to obtain a high S/N ratio in each pixel of an image sensor, so that the time required for the image correction tends to be long.

However, depending on the usage scene, it is not always necessary to obtain a high S/N ratio, and when high accuracy correction data is not required, such as when a simple check is required to be performed, it may be sufficient to make a rough measurement in a short time. That is, there is a demand for a spectroscopic imaging device that has both high accuracy measurement and low accuracy measurement.

SUMMARY

A control method of a spectroscopic imaging device including an imaging element and a spectral element includes: causing the spectroscopic imaging device to generate a first measurement spectrum consisting of N1 wavelengths by imaging a target object by making output wavelengths of the spectral element different when the spectroscopic imaging device is in a first mode; and causing the spectroscopic imaging device to generate a second measurement spectrum consisting of N2 wavelengths by imaging the target object by making the output wavelengths of the spectral element different when the spectroscopic imaging device is in a second mode, in which N1 is an integer greater than or equal to two, and N2 is an integer less than N1.

A spectroscopic imaging device includes an imaging element and a spectral element, in which the spectroscopic imaging device generates a first measurement spectrum consisting of N1 wavelengths by imaging a target object by making output wavelengths of the spectral element different when the spectroscopic imaging device is in a first mode, the spectroscopic imaging device generates a second measurement spectrum consisting of N2 wavelengths by imaging the target object by making the output wavelengths of the spectral element different when the spectroscopic imaging device is in a second mode, and N1 is an integer greater than or equal to two, and N2 is an integer less than N1.

A non-transitory computer-readable storage medium stores a computer program for specifying a target object based on captured data obtained by a spectroscopic imaging device that includes an imaging element and a spectral element, in which the computer program causes a computer to execute at least one of processing of generating a first measurement spectrum consisting of N1 wavelengths, in which N1 is an integer greater than or equal to two, by imaging the target object by making output wavelengths different when the spectroscopic imaging device is in a first mode, and processing of generating a second measurement spectrum consisting of N2 wavelengths, in which N2 is an integer less than N1, by imaging the target object by making the output wavelengths different when the spectroscopic imaging device is in a second mode.

Another aspect is directed to a control method of a display system including a spectroscopic imaging device that includes an imaging element and a spectral element, and a projector that projects a projected image based on image data onto a projection surface, the control method including: causing the spectroscopic imaging device to generate N1 first imaged data obtained by capturing the projected image by making spectral wavelengths of the spectral element different when the display system is in a first mode; causing the projector to generate first corrected image data obtained by correcting first image data based on the N1 first imaged data; causing the projector to project a first projected image based on the first corrected image data onto the projection surface; causing the spectroscopic imaging device to generate N2 second imaged data obtained by capturing the projected image by making the spectral wavelengths of the spectral element different when the display system is in a second mode; causing the projector to generate second corrected image data obtained by correcting the first image data based on the N2 second imaged data; and causing the projector to project a second projected image based on the second corrected image data onto the projection surface, in which N1 is an integer greater than or equal to two, and N2 is an integer less than N1.

In the control method of the display system, data obtained by measuring predetermined information related to colors based on the N1 first imaged data and correcting the first image data based on the measurement result may be the first corrected image data.

In the control method of the display system, the predetermined measurement result obtained from the N2 second imaged data in the second mode may be transformed into information corresponding to the predetermined measurement result obtained from the N1 first imaged data based on the transformation data, and data obtained by correcting the first image data based on the information after the transformation may be used as the second corrected image data.

In the control method of the display system, the projected image including an OSD menu that includes an option of the first mode and the second mode may be projected by the projector.

In the control method of the display system, the spectral element may have a pair of reflective films and a gap changing section configured to change gap dimensions of the pair of reflective films and may be a variable wavelength interference filter disposed on an optical path of light incident on the imaging element.

Another aspect is directed to a control method of a projector that projects a projected image based on image data onto a projection surface, the control method including: causing a spectroscopic imaging device to acquire N1 first imaged data obtained by capturing the projected image by making spectral wavelengths of a spectral element of the spectroscopic imaging device different when the projector is in a first mode; generating first corrected image data obtained by correcting first image data based on the N1 first imaged data; projecting a first projected image based on the first corrected image data onto the projection surface; causing the spectroscopic imaging device to acquire N2 second imaged data obtained by capturing the projected image by making the spectral wavelengths of the spectral element of the spectroscopic imaging device different when the projector is in a second mode; generating second corrected image data obtained by correcting the first image data based on the N2 second imaged data; and projecting a second projected image based on the second corrected image data onto the projection surface, in which N1 is an integer greater than or equal to two, and N2 is an integer less than N1.

Another aspect is directed to a display system including a spectroscopic imaging device that includes an imaging element and a spectral element, and a projector that projects a projected image based on image data onto a projection surface, in which the spectroscopic imaging device generates N1 first imaged data obtained by capturing the projected image by making spectral wavelengths of the spectral element different when the display system is in a first mode, the projector generates first corrected image data obtained by correcting first image data based on the N1 first imaged data and projects a first projected image based on the first corrected image data onto the projection surface, the spectroscopic imaging device generates N2 second imaged data obtained by capturing the projected image by making the spectral wavelengths of the spectral element different when the display system is in a second mode, the projector generates second corrected image data obtained by correcting the first image data based on the N2 second imaged data and projects a second projected image based on the second corrected image data onto the projection surface, and N1 is an integer greater than or equal to two, and N2 is an integer less than N1.

Another aspect is directed to a projector that projects a projected image based on image data onto a projection surface, in which a spectroscopic imaging device acquires N1 first imaged data obtained by capturing the projected image by making spectral wavelengths of a spectral element of the spectroscopic imaging device different when the projector is in a first mode, the projector generates first corrected image data obtained by correcting first image data based on the N1 first imaged data and projects a first projected image based on the first corrected image data onto the projection surface, the spectroscopic imaging device acquires N2 second imaged data obtained by capturing the projected image by making the spectral wavelengths of the spectral element of the spectroscopic imaging device different when the projector is in a second mode, the projector generates second corrected image data obtained by correcting the first image data based on the N2 second imaged data and projects a second projected image based on the second corrected image data onto the projection surface, and N1 is an integer greater than or equal to two, and N2 is an integer less than N1.

DESCRIPTION OF EXEMPLARY EMBODIMENTS

First Embodiment

Hereinafter, embodiments will be described with reference to the accompanying drawings.

First, the configuration of a spectroscopic imaging device 400A will be described with reference to FIG. 1.

Figure 1:
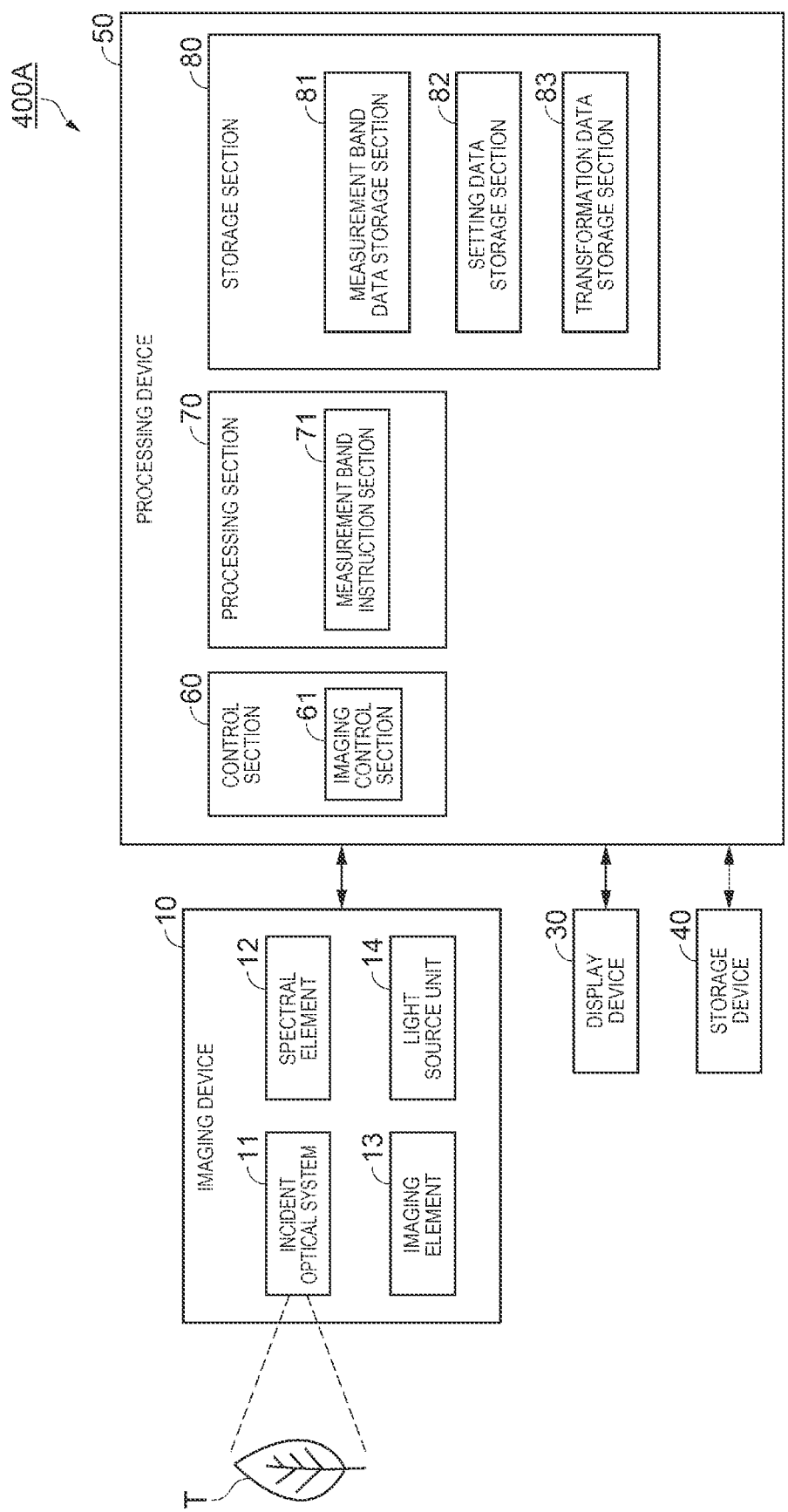
FIG. 1 is a block diagram illustrating a configuration of a spectroscopic imaging device according to a first embodiment.

As illustrated in FIG. 1, the spectroscopic imaging device 400A is for determining, for example, the freshness of a green vegetable (for example, spinach, Japanese mustard spinach, green pepper, or the like) which is a target object T. The spectroscopic imaging device 400A includes an imaging device 10, a display device 30, a storage device 40, and a processing device 50.

The imaging device 10 includes an incident optical system 11, a spectral element 12, an imaging element 13, and a light source unit 14. The incident optical system 11 includes, for example, an autofocus mechanism. The spectral element 12 is, for example, a wavelength selection filter, and a Fabry-Perot type filter capable of changing a transmission wavelength bandwidth is used.

The imaging element 13 includes a first imaging element and a second imaging element (not illustrated). The first imaging element is a charge coupled device (CCD), which is an imaging device that obtains an electric signal representing a target object by photoelectrically transforming light transmitted through the spectral element 12. The second imaging element is, for example, a CCD analog front end (AFE) and is for digitizing a detection signal of the first imaging element. The light source unit 14 is for irradiating the target object T.

In the imaging device 10, the transmission wavelength range of the spectral element 12 is sequentially changed by sequentially receiving instructions in a plurality of measurement bands (multi-bands) from the processing device 50 at the spectral element 12. In this way, the imaging device 10 images the target object T with sensitivities in a plurality of wavelength bandwidths.

The display device 30 is a device for displaying information on a screen. The storage device 40 is an external device for storing data, for example, a hard disk drive device.

The processing device 50 is a device that determines the freshness of the target object T by processing the imaged data obtained by imaging with the imaging device 10. The processing device 50 includes a control section 60 and a processing section 70 that functions as a computer, and a storage section 80.

The control section 60 is configured to include one or a plurality of processors and controls the operation of the spectroscopic imaging device 400A in an integrated manner by operating according to a control program stored in the storage section 80, for example.

The processing section 70 performs various processing by executing the control program as a computer program. The storage section 80 includes a memory such as a random access memory (RAM) and a read only memory (ROM). The RAM is used for the temporary storage of various data and the like, and the ROM stores a control program, control data, or the like for controlling the operation of the spectroscopic imaging device 400A.

The storage section 80 includes a measurement band data storage section 81, a setting data storage section 82, and a transformation data storage section 83. Further, although not illustrated, the storage section 80 stores a program for a freshness determination. The data stored in the storage section 80 will be described in detail later.

The processing section 70 executes processing of a measurement band instruction section 71 by executing the program for a freshness determination stored in the storage section 80. The processing section 70 executes each processing by using the data or parameters saved in the corresponding storage section 80.

An imaging control section 61 of the control section 60 causes the imaging device 10 to execute imaging. In this case, the imaging control section 61 sets the imaging conditions of a high accuracy mode M1 as a first mode, a high speed mode M2 as a second mode, and an optimum mode M3 based on the setting data in a setting data storage section 82.

As a result of each processing, the processing device 50 acquires imaged data obtained by the imaging device 10, determines the freshness of the target object T from the imaged data and transmits the determination result to the display device 30 and the storage device 40. As a result, the result of the freshness determination is displayed on the display device 30 and saved in the storage device 40.

Next, the configuration of the imaging device 10 will be described with reference to FIG. 2.

The imaging device 10 includes the incident optical system 11 on which external light is incident, the spectral element 12 that separates the incident light, and the imaging element 13 that images the light separated by the spectral element 12. The incident optical system 11 is constituted by, for example, a telecentric optical system or the like, and guides the incident light to the spectral element 12 and the imaging element 13 so that an optical axis and main ray are parallel or substantially parallel.

For the spectral element 12, a variable wavelength interference filter is used that includes a pair of substrates 14a and 14b, a pair of reflective films 15 and 16 facing each other, and a gap changing section 17 capable of changing gap dimensions of the reflective films 15 and 16. The gap changing section 17 is constituted by, for example, an electrostatic actuator. The variable wavelength interference filter is also referred to as an etalon. The spectral element 12 is disposed on an optical path of the light incident on the imaging element 13.

The spectral element 12 changes the gap dimensions of the reflective films 15 and 16 by changing the voltage applied to the gap changing section 17 under the control of the processing device 50 and changes an output wavelength $\lambda i$ (i=1, 2, . . . , N), which is a wavelength of the light transmitted through the reflective films 15 and 16.

The imaging element 13 is a device that images the light transmitted through the spectral element 12 and is constituted by, for example, a CCD or CMOS. The imaging device 10 sequentially switches the wavelength of the light separated by the spectral element 12 under the control of the control section 60, images the light transmitted through the spectral element 12 by the imaging element 13, and outputs the imaged data.

The imaged data is data output for each pixel constituting the imaging element 13, and is data indicating the intensity of the light received by the pixel, that is, the amount of light. The imaged data output by the imaging device 10 is input to the processing device 50. Since the imaging device 10 is a wavelength scanning type, it is possible to obtain high resolution imaged data as compared with the case of the wavelength dispersive type.

Next, with reference to FIG. 3, an operation mode that defines an operation state at the time of measurement will be described. In the following, the term "spectral spectrum" may be simply referred to as "spectrum".

Figures 2, 3:
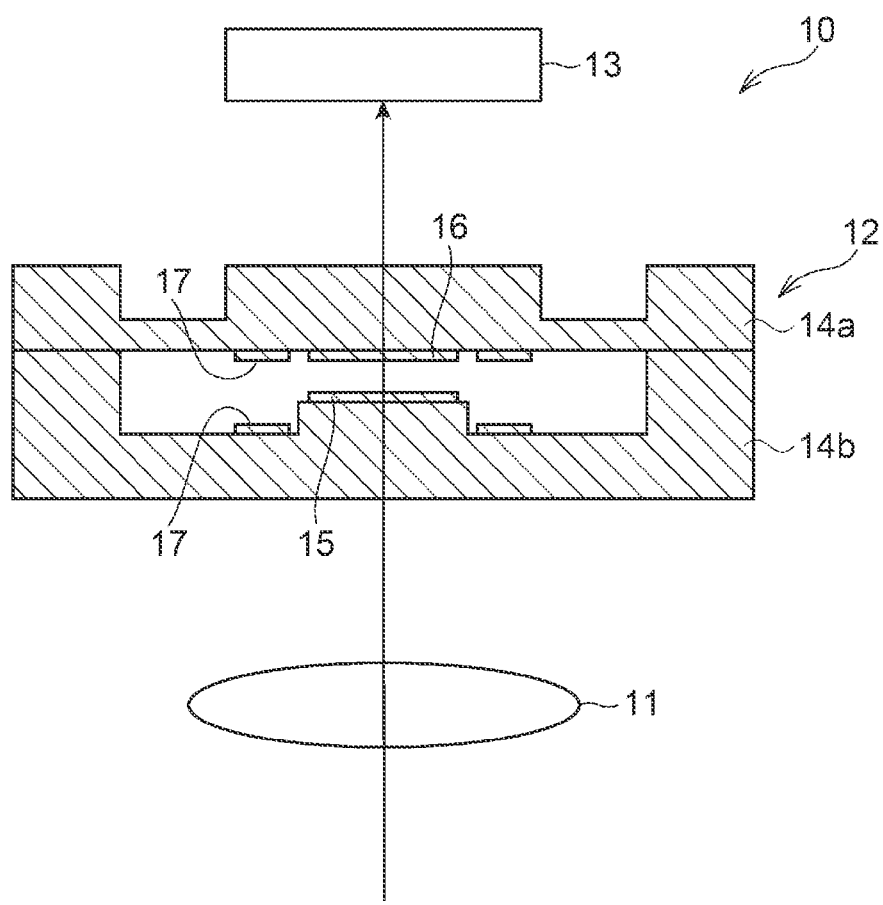
FIG. 2 is a cross-sectional diagram illustrating a configuration of an imaging device.
FIG. 3 is a diagram illustrating a specific example of an operation mode.

As illustrated in FIG. 3, the operation mode includes a high accuracy mode M1, a high speed mode M2, and an optimum mode M3. The high accuracy mode M1 is an operation mode that enables high accuracy measurement by defining the number of wavelengths of the light (output wavelength $\lambda i$) separated by the spectral element 12 to N1, which is relatively large. In contrast to this, the high speed mode M2 is an operation mode in which the time required for the measurement is shortened by defining the number of wavelengths of the light (output wavelength $\lambda i$) separated by the spectral element 12 to N2, which is less than N1. Further, the optimum mode M3 is an operation mode in which the time required for the measurement is substantially intermediate between the high accuracy mode M1 and the high speed mode M2 by selectively increasing or decreasing the number of wavelengths of the light (output wavelength $\lambda i$) separated by the spectral element 12.

Specifically, in the high accuracy mode M1, as illustrated in FIG. 3, for example, the output wavelengths $\lambda i$ are set in the range of 400 nm to 700 nm at 10 nm intervals, and the number of measurement wavelengths N1 is 31. The high accuracy mode M1 may be selected, for example, when it is desired to measure the concentration of a specific substance from a large number of types of mixtures with high accuracy, when there are a plurality of target objects T to be measured, when the spectral spectrum of the target object T has a steep peak shape, when the shape of the spectral spectrum of the target object T is unknown, or the like.

Further, in the high speed mode M2, as illustrated in FIG. 3, for example, the output wavelengths λi are set in the range of 400 nm to 680 nm at 40 nm intervals, and the number of measurement wavelengths N2 is 8. The high speed mode M2 may be selected, for example, when the short tact time is often emphasized in low accuracy measurement, when the shape of the spectral spectrum of the target object T is gentle, when the shape of the spectral spectrum of the target object T is known and it is sufficient to view a specific small number of waveforms, or the like.

In the optimum mode M3, as illustrated in FIG. 3, for example, the output wavelengths λi are set in the range of 400 nm to 600 nm at 40 nm intervals, and the number of measurement wavelengths is set to 5, and further, the output wavelengths λi are set in the range of 600 nm to 700 nm at 10 nm intervals, and the number of measurement wavelengths is set to 11. The optimum mode M3 may be selected, for example, when the shape of the spectral spectrum of the target object T is known, which wavelength should be viewed finely, and which wavelength can be thinned out, when first measuring in the high accuracy mode M1 and selecting the output wavelength λi to be measured from the information, or the like.

In each operation mode, the exposure time is set so that the imaging element 13 can obtain a sufficient S/N ratio, and high accuracy imaged data can be obtained. For example, when the exposure time is set to 60 msec, the measurement time in the high accuracy mode M1 is 2.07 seconds, the measurement time in the high speed mode M2 is 0.53 seconds, and the measurement time in the optimum mode M3 is 1.06 seconds. When N1 is an integer greater than or equal to two and N2 is in a range of positive integers less than N1, the values of N1 and N2 can be changed as appropriate. Further, the high accuracy mode M1 is an example of a first mode, and the high speed mode M2 is an example of a second mode.

Figure 5:
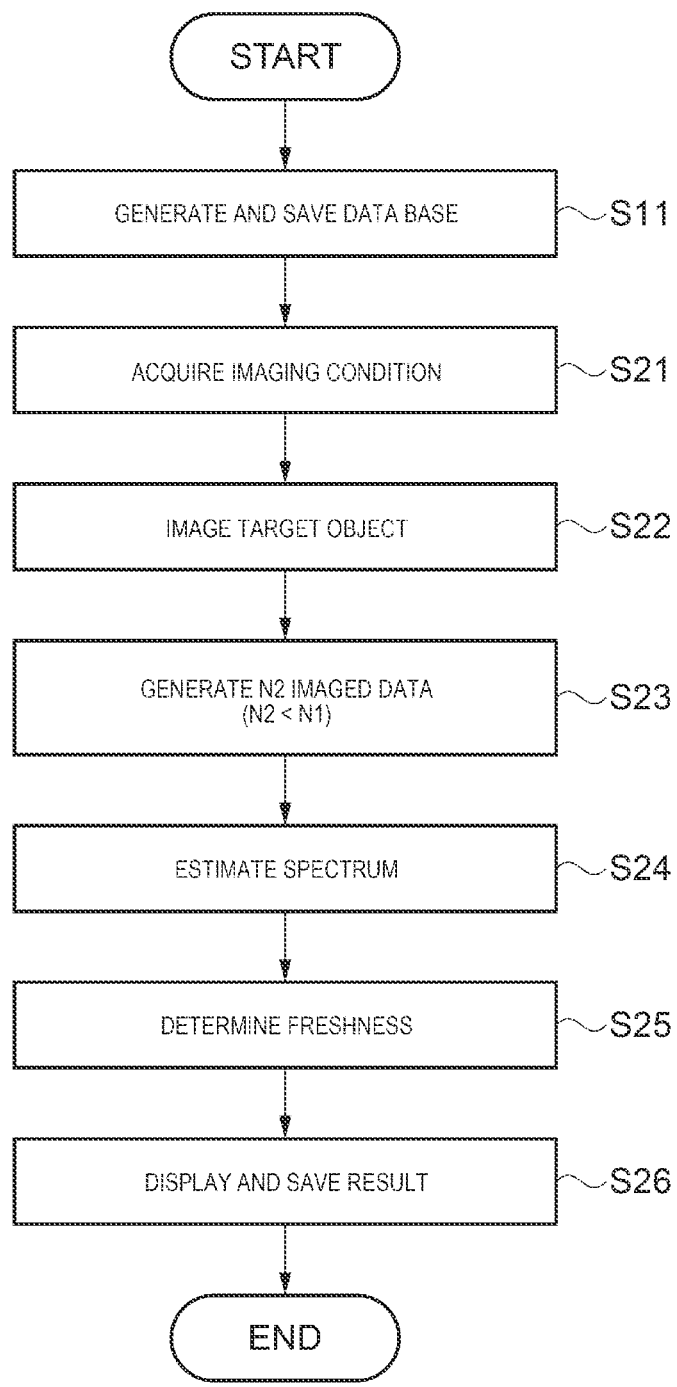
FIG. 5 is a flowchart illustrating a procedure of a freshness determination in a high speed mode.
Figure 6:
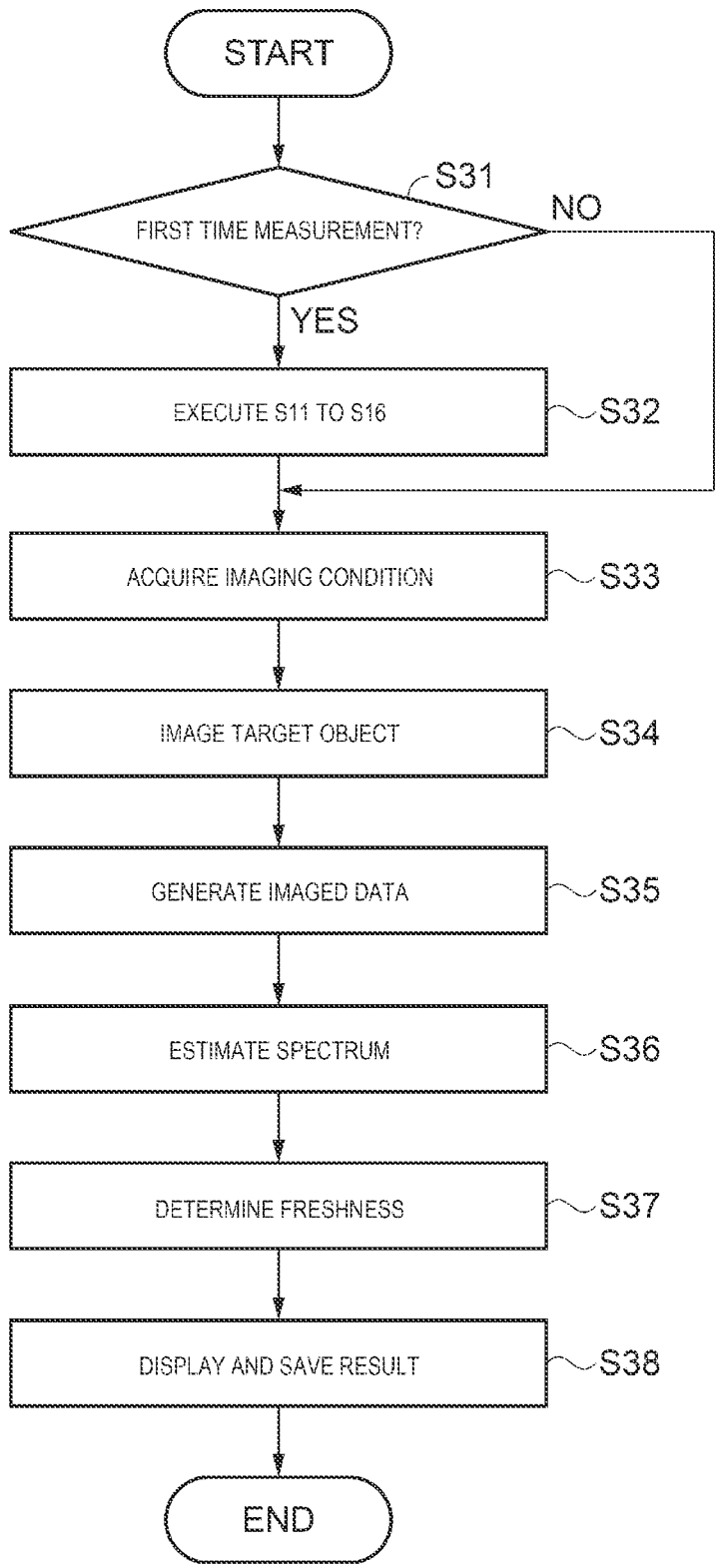
FIG. 6 is a flowchart illustrating a procedure of a freshness determination in an optimum mode.

Next, a method of determining the freshness of green vegetables according to each of the operation modes M1, M2, and M3 will be described with reference to FIGS. 4 to 6.

First, a method of determining the freshness of the target object T in the high accuracy mode M1 will be described with reference to FIG. 4. For example, the operation panel (not illustrated) provided on the display device 30 is operated to select the measurement in the high accuracy mode M1.

In step S11, a database is generated and saved. Specifically, a database required for the freshness determination is generated, and the database is saved in the storage section 80 of the processing device 50. The database referred to here corresponds to various data saved in the storage section 80 (see FIG. 1) in the processing device 50.

The contents and generation method of various data as a database will be described. Various data are measurement band data. The generation and saving of the database may be performed before the spectroscopic imaging device 400A is shipped from the factory or may be omitted when the target object T having known freshness is used. Further, an operator may perform a part of the procedure.

Further, the setting data is data in which the processing conditions for various processing executed by the processing section 70 are set, and is, for example, data including imaging condition for each of the operation modes M1, M2, and M3 which include N1 and N2.

As the transformation data, a transformation matrix M of the following equation (1) can be adopted. p is a vector representing a measurement spectrum (first measurement spectrum) in the high accuracy mode M1 and is composed of 31 elements in the present embodiment. x is a vector representing a measurement spectrum in the high speed mode M2 and is composed of eight elements in the present embodiment. The transformation matrix M is determined so as to estimate a spectrum consisting of m1 wavelengths from a spectrum consisting of m2 wavelengths. By using the transformation data (transformation matrix M), the measurement spectrum that may be obtained in the high accuracy mode M1 can be estimated from the measurement spectrum (second measurement spectrum) obtained in the high speed mode M2. As a method of deriving the transformation matrix M, the method described in JP-A-2012-242270 can be adopted. Further, the equation (1) is established for each pixel in the present embodiment.

$$p = Mx \quad (1)$$

In other embodiments, the spectrum of the target object may be estimated from the measurement spectrum p obtained in the high accuracy mode M1 by using transformation matrix Mq used to approximate the measurement spectrum obtained by a spectroscopic device having higher accuracy (for example, measurement is performed at wavelengths greater than 31). As a method for determining the transformation matrix Mq, the method described in JP-A-2012-242270 can be adopted. The same applies to the case of the high speed mode M2. The "measurement spectrum" of the present embodiment is a spectrum in which luminance values output by any pixels (or pixel group) of the imaging element 13 are arranged along the wavelength.

Next, the measurement band data will be described. When green vegetables get old, chlorophyll is decomposed and the bright green color disappears. From this, it can be seen that the freshness of the green vegetable can be determined from the amount of chlorophyll. In the present embodiment, the freshness of the green vegetable which is the target object T is determined by estimating the amount of chlorophyll as the feature amount of the target object T.

The relationship between the wavelength and reflectance of the light will be described with reference to FIG. 7 in green vegetables having different freshness.

Figure 7:
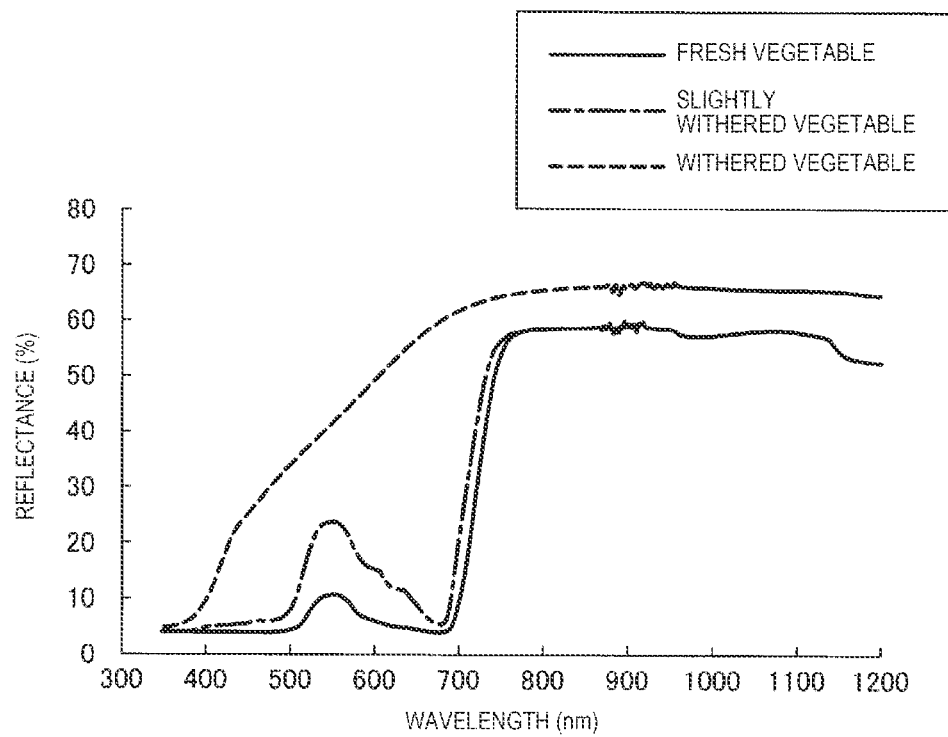
FIG. 7 is a graph illustrating a relationship between a wavelength and a reflectance of light when the freshness is different.

As illustrated in FIG. 7, fresh vegetables (or slightly withered vegetables) absorb light by chlorophyll at substantially 700 nm. Therefore, a plurality of wavelengths in the range of 500 nm to 1100 nm including the wavelength (substantially 700 nm) at which light absorption by chlorophyll occurs are stored as measurement band data in order to instruct the imaging device 10 as the measurement band.

Returning to FIG. 4, in step S12, the output wavelength λi, which is the imaging condition, is acquired. Specifically, the control section 60 acquires the imaging condition of the high accuracy mode M1 included in the setting data storage section 82.

Specifically, for example, 31 measurement band data are acquired from the range of 400 nm to 700 nm at 10 nm intervals. The measurement band data is, for example, 400 nm, 410 nm, 420 nm, . . . , 700 nm.

The measurement band data described above does not necessarily have to be 31 at 10 nm intervals, but may be at 20 nm intervals. Further, the wavelength range is not limited to 400 nm to 700 nm and may be in the range of 350 nm to 1100 nm.

In step S13, the target object T is imaged. Specifically, the imaging control section 61 controls the imaging device 10 to image the target object T by making the output wavelengths $\lambda i$ different according to the acquired imaging condition.

In step S14, N1 imaged data are generated. Specifically, N1 imaged data imaged by making the output wavelengths $\lambda i$ of the spectral element 12 different in order are generated. The N1 imaged data of the present embodiment is 31 imaged data. In the present embodiment, 31 imaged data represent a first spectral spectrum.

In step S15, the freshness determination is performed. Specifically, the processing device 50 determines the freshness of the target object T by using the imaged data output from the imaging device 10.

In step S16, the result is displayed and saved. Specifically, the freshness determination result obtained in step S15 is output to the display device 30 and the storage device 40.

By performing the freshness determination of the green vegetable as the target object T in the high accuracy mode M1 in this way, for example, it is possible to perform a rigorous measurement, and when there is any part that is withered, it can be determined that the freshness is poor. Thereby, for example, only fresh vegetables can be selected.

Next, a method of determining the freshness of the target object T in the high speed mode M2 will be described with reference to FIG. 5. For example, the operation panel (not illustrated) provided on the display device 30 is operated to select the measurement in the high speed mode M2.

First, as in the high accuracy mode M1, in step S11, a database is generated and saved.

Next, in step S21, the output wavelength $\lambda i$, which is the imaging condition, is acquired. Specifically, the control section 60 acquires the imaging condition of the high speed mode M2 included in the setting data storage section 82.

Specifically, for example, 8 measurement band data are acquired from the range of 400 nm to 680 nm at 40 nm intervals. The measurement band data is, for example, 400 nm, 440 nm, 480 nm, . . . , 680 nm.

The measurement band data does not necessarily have to be eight at intervals of 40 nm, and it is preferable that the measurement can be performed in a shorter time than the high accuracy mode M1, and the measurement interval may be changed or the wavelength range may be changed.

In step S22, the target object T is imaged. Specifically, the imaging control section 61 controls the imaging device 10 to image the target object T by making the output wavelengths $\lambda i$ different according to the acquired imaging condition.

In step S23, N2 imaged data are generated. Specifically, N2 imaged data imaged by making the output wavelengths $\lambda i$ of the spectral element 12 different in order are generated. The N2 imaged data of the present embodiment is 8 imaged data.

In step S24, as an option, the spectral spectrum as a second spectral spectrum is estimated. Specifically, the spectral spectrum obtained from the N1 imaged data is estimated based on the transformation data M stored in the transformation data storage section 83 of the storage section 80.

After that, steps S25 and S26 are performed in the same manner as steps S15 and S16 in the high accuracy mode M1.

As described above, the transformation data is acquired in advance that associates the spectral spectrum result of the color obtained from the N1 imaged data in the high accuracy mode M1 with the spectral spectrum result of the color obtained from the N2 imaged data in the high speed mode M2. Therefore, in the case of the high speed mode M2, the spectral spectrum result of the color obtained from the N2 imaged data is transformed into information corresponding to the spectral spectrum result of the color obtained from the N1 imaged data based on the transformation data. The imaged data input based on the information after the transformation is used as the imaged data after the correction. As a result, the shift or the like of the peak wavelength of each color that occurs when the spectral spectrum is estimated using only a relatively small number of imaged data is set within the allowable range, the measurement accuracy is sufficiently maintained, and thus it is possible to perform the appropriate correction.

By performing the freshness determination of the green vegetable as the target object T in the high speed mode M2 in this way, for example, compared with the case of the high accuracy mode M1, the freshness determination can be performed in a short time, and when a rough freshness determination is sufficient, the efficiency of measurement can be improved.

Next, a method of determining the freshness in the optimum mode M3 will be described with reference to FIG. 6. For example, the optimum mode M3 is selected by operating the operation panel disposed on the display device 30.

In step S31, it is determined whether the performing of the freshness determination processing is the first time. When it is the measurement for the first time, the process proceeds to step S32. When it is the measurement at the second time or more, the process proceeds to step S33.

Figure 4:
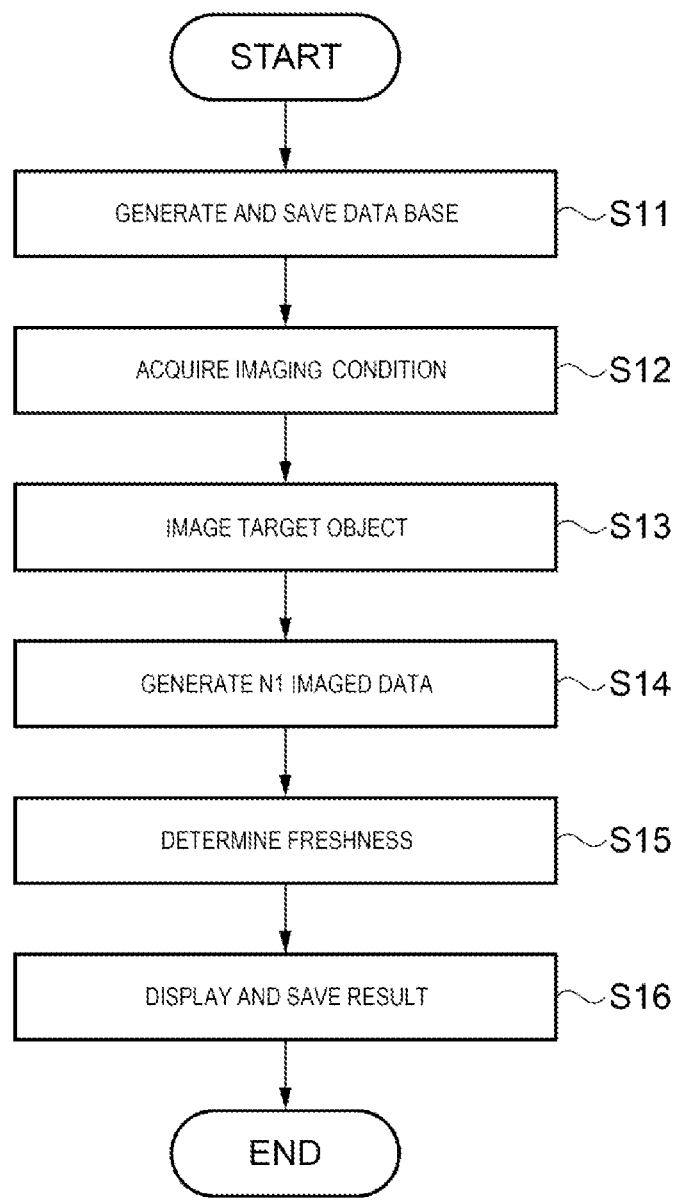
FIG. 4 is a flowchart illustrating a procedure of a freshness determination in a high accuracy mode.

In step S32, the freshness measurement is performed in the high accuracy mode M1 in the same manner as in the flow illustrated in FIG. 4. In the case of the measurement at the second time or more, since the process in step S32 is being performed, the process proceeds to step S33.

Next, in step S33, the output wavelength $\lambda i$, which is the imaging condition, is acquired. Specifically, the control section 60 acquires the imaging condition of the optimum mode M3 included in the setting data storage section 82.

Specifically, for example, 5 measurement band data are acquired from the range of 400 nm to 600 nm at 40 nm intervals. The measurement band data is, for example, 400 nm, 440 nm, . . . nm, 600 nm. Further, 11 measurement band data are acquired from 600 nm to 700 nm at 10 nm intervals. The measurement band data is, for example, 600 nm, 610 nm, . . . nm, 700 nm.

The measurement band data is not limited to the above. For example, the intervals of the output wavelengths $\lambda i$ may be made different based on at least one of the first spectral spectrum obtained in the high accuracy mode M1 and the second spectral spectrum obtained in the high speed mode M2 (in other words, the intervals may be unequal). The intervals of the output wavelengths $\lambda i$ may be made different based on the first spectral spectrum.

For example, as illustrated in FIG. 7, it may be set such that the measurement is performed in a wavelength bandwidth in which the change in reflectance is large (in other words, the wavelength bandwidth with large undulations in the spectral spectrum), for example, in the range of 500 nm to 600 nm at 10 nm intervals or in the range of 700 nm to 800 nm at 10 nm intervals. Further, in other wavelength bandwidths (in other words, wavelength bandwidths having a flat spectral spectrum), the measurement may be performed at 40 nm intervals. Further, the interval of wavelengths to be measured is not limited to a 40 nm interval or a 10 nm interval. By performing the measurement in this way, it is possible to perform the measurement in a shorter time than in the high accuracy mode M1 and perform the measurement in which the decrease in accuracy is suppressed.

In step S34, the target object T is imaged. Specifically, the imaging control section 61 controls the imaging device 10 to image the target object T by making the output wavelengths Ai different according to the acquired imaging condition.

In step S35, imaged data is generated. Specifically, imaged data imaged by making the output wavelengths λi of the spectral element 12 different in order are generated. In the present embodiment, for example, it is 16 imaged data.

In step S36, the spectral spectrum is estimated based on the above calculation equation. As a result, an image of the spectral spectrum for each set wavelength (for each color) can be obtained.

After that, steps S37 and S38 are performed in the same manner as steps S15 and S16 in the high accuracy mode M1.

By performing the freshness determination of the green vegetable as the target object T in the optimum mode M3 in this way, for example, since the wavelength bandwidth that greatly affects the freshness determination is known as compared with the case of the high accuracy mode M1, the wavelength bandwidth can be measured finely, and the other parts can be roughly measured. Thereby, the freshness determination can be performed in a short time as compared with the high accuracy mode M1, and it is possible to suppress a decrease in measurement accuracy. As a result, the efficiency of measurement can be improved.

As described above, the control method of the spectroscopic imaging device 400A, which includes an imaging element 13 and a spectral element 12, of the present embodiment, includes causing the spectroscopic imaging device 400A to generate a first measurement spectrum consisting of N1 wavelengths by imaging the target object T by making the output wavelengths λi of the spectral element 12 different when the spectroscopic imaging device 400A is in the high accuracy mode M1, and causing the spectroscopic imaging device 400A to generate a second measurement spectrum consisting of N2 wavelengths by imaging the target object T by making the output wavelengths λi of the spectral element 12 different when the spectroscopic imaging device 400A is in the high speed mode M2, in which N1 is an integer greater than or equal to two, and N2 is a positive integer less than N1.

According to the method, since N1 is an integer greater than or equal to two and N2 is an integer less than N1, in the case of rigorous measurement, the high accuracy mode M1 can be used. On the other hand, in the case of simple measurement, by using the high speed mode M2, the target object T can be measured in a shorter time as compared with the case of the high accuracy mode M1. Therefore, it is possible to improve the convenience or efficiency of a user in measuring various scenes, and it is possible to selectively perform high accuracy measurement and low accuracy measurement.

Further, it is preferable to derive, that is, estimate the spectrum of the target object T based on the first measurement spectrum generated in the high accuracy mode M1 or the second measurement spectrum generated in the high speed mode M2.

According to the method, since the spectrum of the target object T is derived, that is, estimated based on the first measurement spectrum and the second measurement spectrum, it is possible to derive a spectral spectrum in which the peak wavelength of each color is positioned at substantially the same wavelength as the spectral spectrum obtained from the N1 imaged data and the N2 imaged data.

Further, it is preferable to estimate the spectrum of the target object T by transforming the second measurement spectrum obtained in the high speed mode M2 by using the transformation data that estimates the spectrum consisting of N1 wavelengths from the spectrum consisting of N2 wavelengths.

According to the method, since the transformation data is acquired in advance, it is possible to obtain the imaged data corresponding to N1 from the imaged data of N2 which is less than N1.

Further, the spectrum of the target object T has a first measurement spectrum obtained in the high accuracy mode M1 and a second measurement spectrum obtained in the high speed mode M2, and it is preferable that the intervals of the output wavelengths λi are made different based on at least one of the first measurement spectrum and the second measurement spectrum.

According to the method, for example, it is possible to suppress the accuracy of the imaged data and perform efficient measurement by selecting a wavelength bandwidth that can be thinned out from the shape of the spectrum, such as acquiring one or two imaged data for a wavelength bandwidth with a flat spectrum and acquiring imaged data finely in the wavelength bandwidth of the spectrum with peaks.

Further, the spectral element 12 has a pair of reflective films 15 and 16 and a gap changing section 17 capable of changing the gap dimensions of the pair of reflective films 15 and 16, and it is preferable that the spectral element is a variable wavelength interference filter disposed on the optical path of the light incident on the imaging element 13.

According to the method, since the variable wavelength interference filter is used, for example, it is possible to perform the high accuracy measurement and the short-time measurement while maintaining a high resolution as compared with the case of the wavelength dispersive type.

The spectroscopic imaging device 400A includes an imaging element 13 and a spectral element 12, in which the spectroscopic imaging device 400A generates a first measurement spectrum consisting of N1 wavelengths by imaging the target object T by making the output wavelengths λi of the spectral element 12 different when the spectroscopic imaging device 400A is in the high accuracy mode M1, the spectroscopic imaging device 400A generates a second measurement spectrum consisting of N2 wavelengths by imaging the target object T by making the output wavelengths λi of the spectral element 12 different when the spectroscopic imaging device 400A is in the high speed mode M2, and N1 is an integer greater than or equal to two, and N2 is an integer less than N1.

According to the configuration, since N1 is an integer greater than or equal to two and N2 is an integer less than N1, in the case of rigorous measurement, the high accuracy mode M1 can be used. On the other hand, in the case of simple measurement, by using the high speed mode M2, the target object T can be measured in a shorter time as compared with the case of the high accuracy mode M1. Therefore, it is possible to improve the convenience or efficiency of a user in measuring various scenes, and it is possible to selectively perform high accuracy measurement and low accuracy measurement.

A computer program is a computer program for specifying the target object T based on the imaged data obtained by the spectroscopic imaging device 400A which includes the imaging element 13 and the spectral element 12, in which the computer program causes the computer as the processing section 70 to execute at least one of the processing of generating the first measurement spectrum consisting of N1 wavelengths, where N1 is an integer greater than or equal to two, by imaging the target object T by making the output wavelengths λi different when the spectroscopic imaging device 400A is in the high accuracy mode M1, and the processing of generating the second measurement spectrum consisting of N2 wavelengths, where N2 is an integer less than N1, by imaging the target object T by making the output wavelengths λi different when the spectroscopic imaging device 400A is in the high speed mode M2.

According to the computer program, since N1 is an integer greater than or equal to two and N2 is an integer less than N1, in the case of rigorous measurement, the high accuracy mode M1 can be used. On the other hand, in the case of simple measurement, by using the high speed mode M2, the target object T can be measured in a shorter time as compared with the case of the high accuracy mode M1. Therefore, it is possible to improve the convenience or efficiency of a user in measuring various scenes, and it is possible to selectively perform high accuracy measurement and low accuracy measurement.

Hereinafter, a modification example of the above embodiment will be described.

Figure 8:
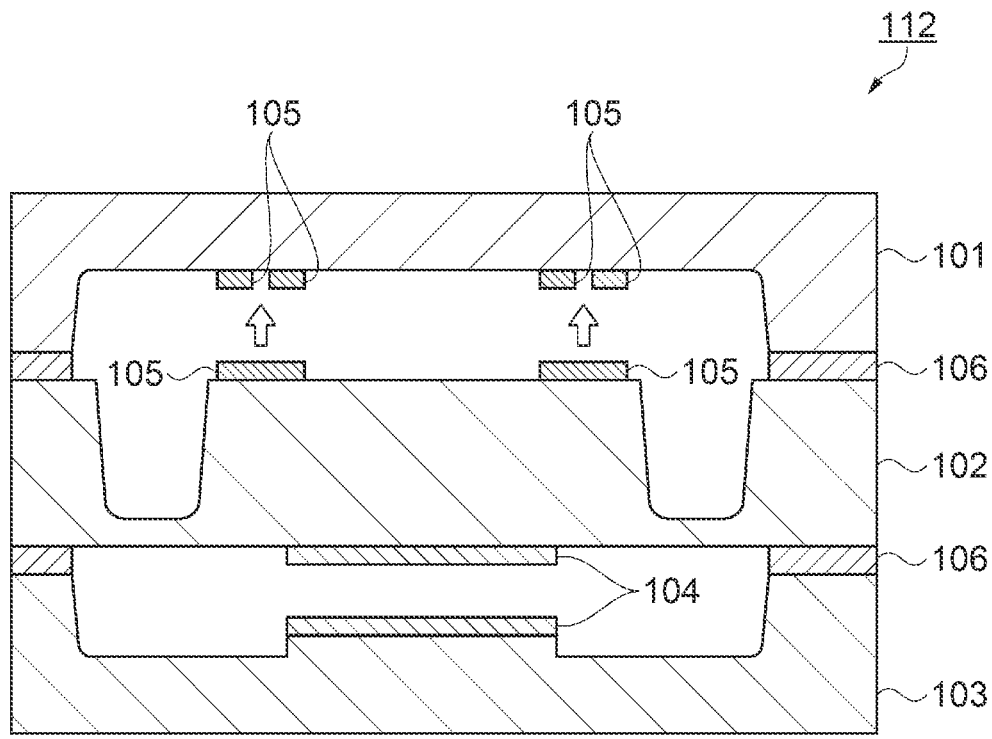
FIG. 8 is a cross-sectional diagram illustrating a configuration of a spectral element of a modification example.

The spectral element 12 is not limited to the above-described configuration and may have a configuration as illustrated in FIG. 8. FIG. 8 is a cross-sectional diagram illustrating the structure of a spectral element 112 of the modification example. The spectral element 112 of the modification example is different from the spectral element 12 of the above embodiment in a part constituted by a first substrate 101, a second substrate 102, and a third substrate 103.

As illustrated in FIG. 8, in the spectral element 112 of the modification example, as described above, the first substrate 101, the second substrate 102, and the third substrate 103 are bonded via a bonding layer 106, for example. A pair of reflective films 104 are disposed on surfaces of the second substrate 102 and the third substrate 103 that face each other. Electrostatic actuators 105 capable of changing the gap dimension of the reflective film 104 are disposed on surfaces of the first substrate 101 and the second substrate 102 that face each other. Even in such a structure, it is possible to provide the spectral element 112 having the same function as the spectral element 12 described above.

Further, in the optimum mode M3 of the above embodiment, when performing the measurement for the first time, after the measurement is performed in the high accuracy mode M1, the imaging condition of the optimum mode M3 is acquired and then the target object T is imaged, but the present disclosure is not limited to this. For example, in a case where various information when the measurement is performed in the high accuracy mode M1 is obtained, the process may be started from step S33 (see FIG. 6) even for the measurement for the first time.

As described above, the spectroscopic imaging device 400A is used for the freshness determination of the target object T such as vegetable, but the present disclosure is not limited to this, and for example, as a color determination, it may be used for an exterior component made of resin or metal, a printed matter, dyed fibers, a display body such as a display. Further, as the component analysis by spectroscopy, the presence or absence of water or organic substances, concentration calibration, and the like can be mentioned. Further, not limited to these, all that can be specified by spectroscopy are targeted. Examples of applications using the spectroscopic imaging device 400A include a colorimeter for a printer, an image quality inspection camera, and the like. Examples of the image quality inspection camera include color inspection, stain or dirt (deposits) inspection, and the like.

Second Embodiment

Hereinafter, embodiments of the display system will be described with reference to the accompanying drawings.

Figure 9:
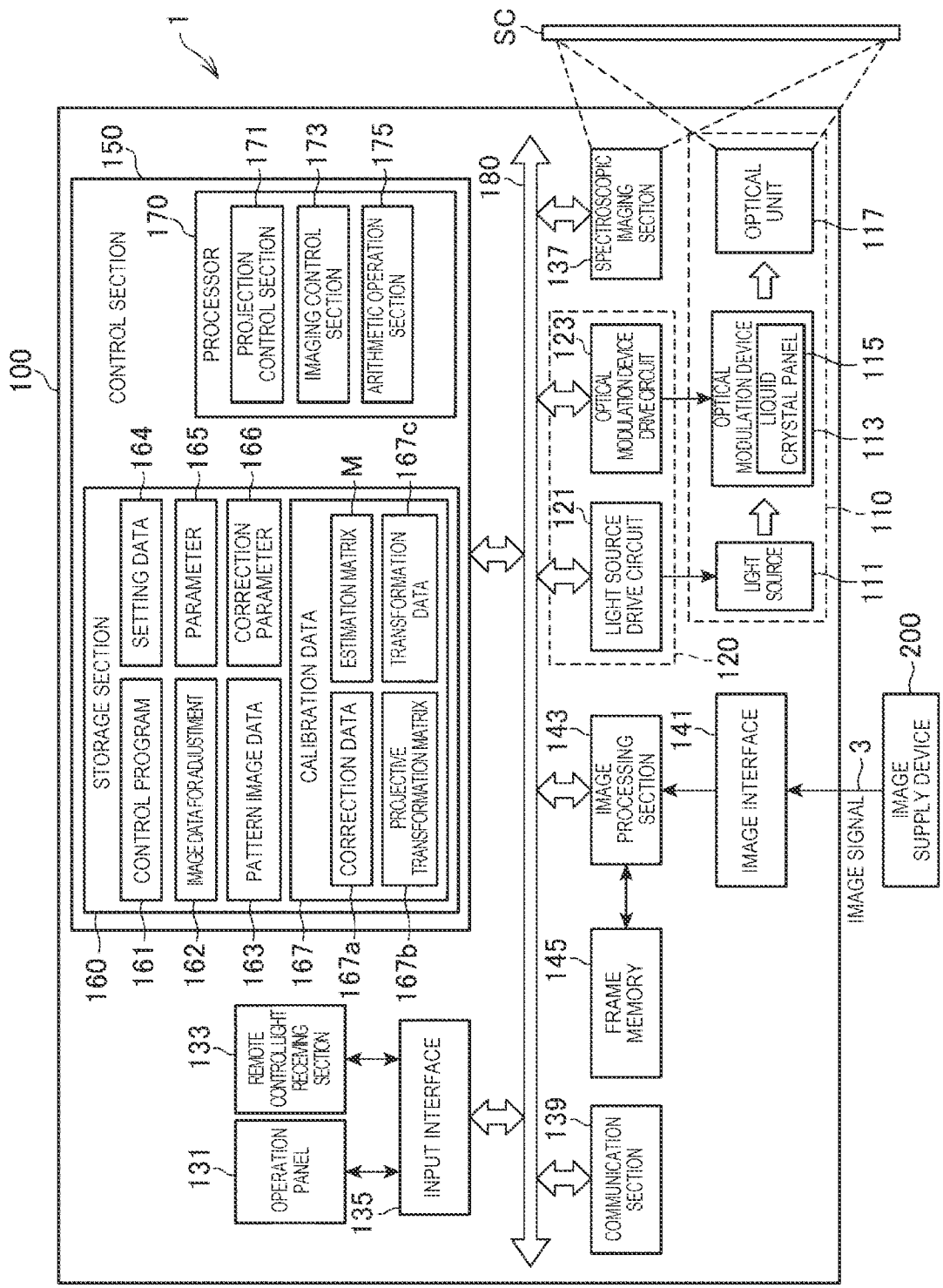
FIG. 9 is a block diagram illustrating a configuration of a display system of a second embodiment.

FIG. 9 is a block diagram illustrating a configuration of a display system 1 having a projector 100. In this display system 1, a configuration corresponding to a spectroscopic imaging device is integrally provided with the projector 100. The spectroscopic imaging device is also referred to as a spectroscopic camera and is not limited to hardware such as a spectroscopic imaging section 137 described later and includes software or a processor for realizing the operation of the spectroscopic imaging device.

The projector 100 includes an image projection system that generates image light and projects the image onto a screen SC that constitutes a projection surface, an image processing system that electrically processes the image data that is the source of an optical image, and the spectroscopic imaging section 137 that images the image light displayed on the screen SC. Further, the projector 100 includes an image projection system, an image processing system, and a control section 150 that controls the spectroscopic imaging section 137.

Image Projection System

The image projection system includes a projection section 110 and a drive section 120. The projection section 110 is an example of a display section that displays an image corresponding to the projected image. The projection section 110 includes a light source 111, an optical modulation device 113, and an optical unit 117. The drive section 120 includes a light source drive circuit 121 and an optical modulation device drive circuit 123. The light source drive circuit 121 and the optical modulation device drive circuit 123 are coupled to a bus 180 and perform data communication with other components of the projector 100 which is also coupled to the bus 180 via the bus 180. The other components include, for example, the control section 150 or an image processing section 143 illustrated in FIG. 9.

As the light source 111, a solid-state light source such as a light emitting diode (LED) or a laser light source is used. Further, as the light source 111, a lamp such as a halogen lamp, a xenon lamp, or an ultrahigh pressure mercury lamp can be used. The light source drive circuit 121 is coupled to the light source 111. The light source drive circuit 121 supplies a drive current or pulse to the light source 111 to turn on the light source 111 and stops the supplied drive current or pulse to turn off the light source 111.

The optical modulation device 113 includes an optical modulation element that modulates the light emitted by the light source 111 to generate image light. As the optical modulation element, for example, a transmissive type or reflective type liquid crystal panel, a digital mirror device, or the like can be used. In the present embodiment, a case where the optical modulation device 113 includes a transmissive type liquid crystal panel 115 as an optical modulation element will be described as an example. The optical modulation device 113 includes three liquid crystal panels 115 corresponding to the three primary colors of red, green, and blue. The light modulated by the liquid crystal panel 115 is incident on the optical unit 117 as image light. In the following, red is referred to as "R", green is referred to as "G", and blue is referred to as "B".

The optical modulation device drive circuit 123 is coupled to the optical modulation device 113. The optical modulation device drive circuit 123 drives the optical modulation device 113 to draw an image on the liquid crystal panel 115 in frame units. The optical unit 117 includes an optical element such as a lens or a mirror and projects the image light modulated by the optical modulation device 113 toward the screen SC. An image based on the image light projected by the optical unit 117 is formed on the screen SC. An image formed on the screen SC by the image light projected by the projection section 110 is referred to as a projected image.

Operation Input System

The projector 100 includes an operation panel 131, a remote control light receiving section 133, and an input interface 135. The input interface 135 is coupled to the bus 180 and performs data communication with the control section 150 and the like via the bus 180. The operation panel 131 is disposed in a housing of the projector 100, for example, and includes various switches. When the switch on the operation panel 131 is operated, the input interface 135 outputs an operation signal corresponding to the operated switch to the control section 150.

The remote control light receiving section 133 receives an infrared signal transmitted by the remote controller (remote control). The remote control light receiving section 133 outputs an operation signal corresponding to the received infrared signal. The input interface 135 outputs the input operation signal to the control section 150. This operation signal is a signal corresponding to a switch of the operated remote controller.

Spectroscopic Imaging Section

The spectroscopic imaging section 137 captures the projected image displayed on the screen SC by the projection section 110 and outputs the spectroscopic imaged data.

Figures 10, 11:
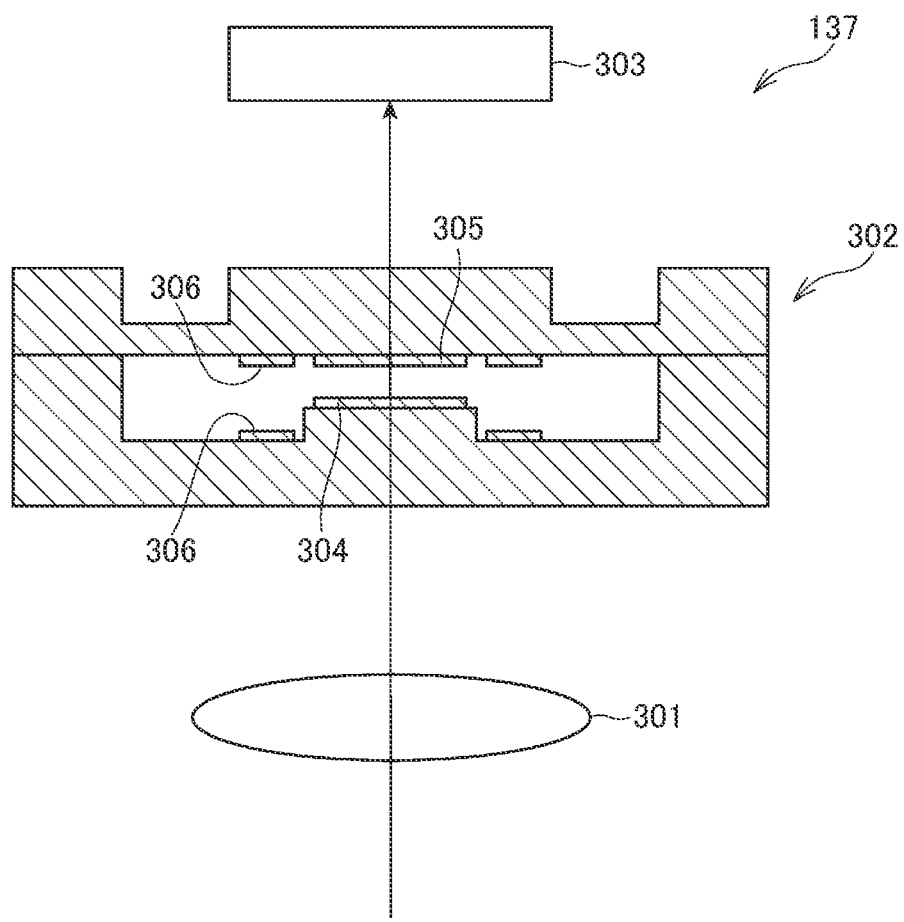
FIG. 10 is a schematic configuration diagram of a spectroscopic imaging section.
FIG. 11 is a diagram illustrating specific examples of a high accuracy mode and a high speed mode.

FIG. 10 is a schematic configuration diagram of the spectroscopic imaging section 137. The spectroscopic imaging section 137 is an example of the "spectroscopic imaging device" according to the present disclosure. The spectroscopic imaging section 137 includes an incident optical system 301 on which external light is incident, a spectral element 302 that separates the incident light, and an imaging element 303 that images the light separated by the spectral element 302.

The incident optical system 301 is constituted by, for example, a telecentric optical system or the like, and guides the incident light to the spectral element 302 and the imaging element 303 so that an optical axis and main ray are parallel or substantially parallel. For the spectral element 302, a variable wavelength interference filter including a pair of reflective films 304 and 305 that face each other and a gap changing section 306 capable of changing the gap dimensions of the reflective films 304 and 305 are used. The gap changing section 306 is constituted by, for example, an electrostatic actuator. The variable wavelength interference filter is also referred to as an etalon. The spectral element 302 is disposed on an optical path of the light incident on the imaging element 303.

The spectral element 302 changes the gap dimensions of the reflective films 304 and 305 by changing the voltage applied to the gap changing section 306 under the control of the control section 150 and is capable of changing a spectral wavelength $\lambda i$ (i=1, 2, ..., N), which is a wavelength of the light transmitted through the reflective films 304 and 305. The imaging element 303 is a device that images the light transmitted through the spectral element 302 and is constituted by, for example, a CCD or CMOS. The spectroscopic imaging section 137 sequentially switches the wavelength of the light separated by the spectral element 302 under the control of the control section 150, images the light transmitted through the spectral element 302 by the imaging element 303, and outputs the spectroscopic imaged data. The spectroscopic imaged data is data output for each pixel constituting the imaging element 303, and is data indicating the intensity of the light received by the pixel, that is, the amount of light. The spectroscopic imaged data output by the spectroscopic imaging section 137 is input to the control section 150. Since the spectroscopic imaging section 137 is a wavelength scanning type, it becomes easier to obtain high resolution spectroscopic imaged data as compared with the case of the wavelength dispersive type.

Communication Section

Figure 14:
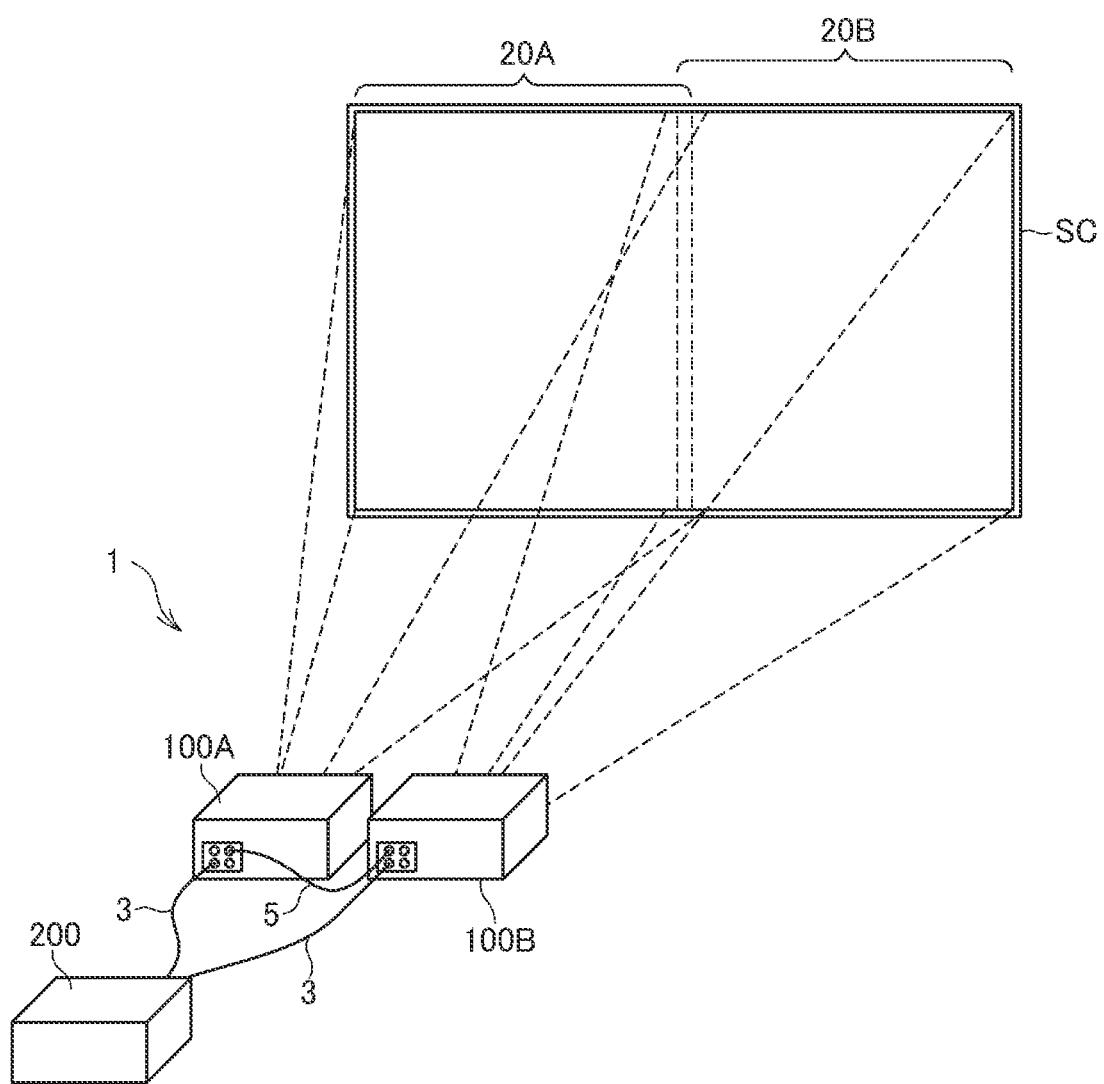
FIG. 14 is a block diagram illustrating a configuration of a display system of a third embodiment.

As illustrated in FIG. 9, the projector 100 includes a communication section 139. The communication section 139 is coupled to the bus 180. As illustrated in FIG. 14, which will be described later, when a plurality of projectors 100 are coupled, the communication section 139 functions as an interface when data communication is performed between the projectors 100. The communication section 139 of the present embodiment is a wired interface where a cable is coupled but may be a wireless communication interface for executing wireless communication such as a wireless LAN or Bluetooth. "Bluetooth" is a registered trademark.

Image Processing System

Next, the image processing system of the projector 100 will be described.

As illustrated in FIG. 9, the projector 100 includes an image interface 141, an image processing section 143, and a frame memory 145 as an image processing system. The image processing section 143 is coupled to the bus 180 and performs data communication with the control section 150 and the like via the bus 180.

The image interface 141 is an interface for receiving an image signal and includes a connector to which a cable 3 is coupled and an interface circuit for receiving the image signal via the cable 3. The image interface 141 extracts image data or a synchronization signal from the received image signal and outputs the extracted image data and the synchronization signal to the image processing section 143. Further, the image interface 141 outputs a synchronization signal to the control section 150. The control section 150 controls other components of the projector 100 in synchronization with the synchronization signal. The image processing section 143 performs image processing on the image data in synchronization with the synchronization signal.

An image supply device 200 is coupled to the image interface 141 via the cable 3. As the image supply device 200, for example, a notebook personal computer (PC), a desktop PC, a tablet terminal, a smartphone, and a personal digital assistant (PDA) can be used. Further, the image supply device 200 may be a video playback device, a DVD player, a Blu-ray disc player, or the like. The image signal input to the image interface 141 may be a moving image or a still image, and any data format can be used. The connection is not limited to the wired connection using the cable 3 and may be a wireless connection using wireless communication.

The image processing section 143 and the frame memory 145 are configured with, for example, an integrated circuit. The integrated circuit includes a large-scale integrated circuit (LSI), an application specific integrated circuit (ASIC), a programmable logic device (PLD), a field-programmable gate array (FPGA), a system-on-a-chip (SoC), or the like.

Further, an analog circuit may be included as a part of the configuration of the integrated circuit.

The image processing section 143 is coupled to the frame memory 145. The image processing section 143 loads the image data input from the image interface 141 into the frame memory 145, and performs image processing on the loaded image data.

The image processing section 143 executes various processing including, for example, geometric correction processing of correcting the trapezoidal distortion of a projected image, OSD processing of superimposing an on screen display (OSD) menu, and the like. Further, the image processing section 143 executes image processing such as image adjustment processing of adjusting the luminance or hue of the image data, resolution conversion processing of adjusting the aspect ratio or resolution of the image data according to the optical modulation device 113, and frame rate conversion.

The image processing section 143 outputs the image data in which the image processing is ended to the optical modulation device drive circuit 123. The optical modulation device drive circuit 123 generates a drive signal for each of the red, green, and blue colors based on the image data input from the image processing section 143. The optical modulation device drive circuit 123 drives the liquid crystal panel 115 of the corresponding color of the optical modulation device 113 based on the generated drive signal of each color and draws an image on the liquid crystal panel 115 of each color. When the light emitted from the light source 111 passes through the liquid crystal panel 115, the image light corresponding to the image of the image data is generated.

Control Section/Storage Section

The control section 150 includes a storage section 160 and a processor 170.

The storage section 160 is constituted by, for example, a non-volatile semiconductor memory such as a flash memory or EEPROM, or a solid state drive (SSD) using the flash memory. In the present embodiment, the case where the control section 150 includes the storage section 160 is described, but for example, the storage section 160 configured with the hard disk drive may be provided outside the control section 150. The storage section 160 stores a control program 161, image data such as image data 162 for adjustment or pattern image data 163, setting data 164, parameter 165, correction parameter 166, calibration data 167, and the like. The control section 150 and the spectroscopic imaging section 137 correspond to an example of the "spectroscopic imaging device" according to the present disclosure.

The control program 161 is a program such as an operating system (OS) executed by the processor 170 or an application program. The processor 170 measures information related to the color and the like of the image projected on the screen SC by controlling each section or performing arithmetic operation processing according to the control program 161 and performs processing of using the measurement result for correcting the projected image. In the following description, this processing will be appropriately referred to as "measurement/image quality adjustment processing".

The operation mode that defines the operation state when the measurement/image quality adjustment processing is performed includes a high accuracy mode and a high speed mode. As illustrated in FIG. 11, the high accuracy mode is an operation mode that enables high accuracy measurement by defining the number of wavelengths of the light (spectral wavelength λi) separated by the spectral element 302 to N1, which is relatively large. In contrast to this, the high speed mode is an operation mode in which the time required for the measurement is shortened by defining the number of wavelengths of the light (spectral wavelength λi) separated by the spectral element 302 to N2, which is less than N1.

FIG. 11 illustrates a case where the spectral wavelength λi is set in the range of 400 nm to 700 nm at 10 nm intervals as an example of the high accuracy mode, and N1 is 31. Further, FIG. 11 illustrates a case where the spectral wavelength λi is set in the range of 400 nm to 680 nm at 40 nm intervals as an example of the high speed mode, and N2 is 8. In each operation mode, the exposure time is set so that the imaging element 303 can obtain a sufficient S/N ratio, and high accuracy spectroscopic imaged data can be obtained. For example, when the exposure time is set to 60 msec, the measurement time in the high accuracy mode is 2.07 seconds, and the measurement time in the high speed mode is 0.53 seconds. When N1 is an integer greater than or equal to two and N2 is in a range of integers less than N1, the values of N1 and N2 can be changed as appropriate. The high accuracy mode is an example of a "first mode" according to the present disclosure, and the high speed mode is an example of a "second mode" according to the present disclosure.

Returning to FIG. 9, the setting data 164 is data in which the processing conditions for various processing executed by the processor 170 are set, and is, for example, data including the imaging condition for each operation mode including the above N1 and N2. The parameter 165 is, for example, a parameter for the image processing to be executed by the image processing section 143.

The image data stored in the storage section 160 is data that is the source of the image displayed on the screen SC by the projector 100 and includes, for example, pattern image data 163 or image data 162 for adjustment. The pattern image data 163 is, for example, image data in which marks having a predetermined shape are disposed at four corners. The processor 170 acquires imaged data (may be spectroscopic imaged data) when an image corresponding to the pattern image data 163 is projected on the screen SC. Further, the processor 170 acquires information (in the present configuration, a projective transformation matrix 167b) that associates the pixels projected on the screen SC with the pixels of the liquid crystal panel 115 based on the acquired imaged data.

The image data 162 for adjustment is, for example, monochrome image data of each of the RGB colors. The control section 150 acquires spectroscopic imaged data for each spectral wavelength λi when an image corresponding to the image data 162 for adjustment is projected onto the screen SC and acquires correction data 167a for correcting each spectroscopic imaged data based on the spectroscopic imaged data. In this case, in case of the high accuracy mode, N1 spectroscopic imaged data are acquired, and in the case of the high speed mode, N2 spectroscopic imaged data, which is less than N1, are acquired. A predetermined measurement target is measured based on the acquired spectroscopic imaged data. The measurement targets are the absolute value of each of the RGB colors and the color unevenness in the projection surface.

The correction parameter 166 is a parameter generated by the "measurement/image quality adjustment processing" and is an image processing parameter for correcting the absolute value or color unevenness of each color in the input image data by the image processing section 143.

The calibration data 167 includes correction data 167a, projective transformation matrix 167b, estimation matrix M, and transformation data 167c. The correction data 167a is data for correcting the sensitivity distribution of the imaging element 303 and corrects the spectroscopic imaged data so that the output of the imaging element 303 becomes uniform.

In the imaging element 303, the output of each pixel constituting the imaging element 303 is not uniform and differs depending on the position of the pixel due to the affection of lens aberration or the like of the lens included in the incident optical system 301. That is, the sensitivity distribution is generated in the imaging element 303. The output of the sensitivity distribution decreases in the peripheral part than the center of the imaging element 303. Therefore, when correcting the color or the like of an image based on the spectroscopic imaged data imaged by the spectroscopic imaging section 137, it may not be possible to accurately correct the color or the like due to the affection of an error. Further, the sensitivity distribution of the spectroscopic imaging section 137 is affected by the ultraviolet rays coated on the lens surface or the optical filter that cuts infrared rays. That is, the output of the spectroscopic imaging section 137 differs depending on the color of the image captured by the spectroscopic imaging section 137.

The correction data 167a is generated at the time of manufacturing the projector 100 or the like and is also generated for each pixel of the imaging element 303. Further, a plurality of correction data 167a are generated corresponding to the light of each of the RGB colors projected by the projection section 110 and the spectral wavelength $\lambda i$ set in the spectroscopic imaging section 137. By generating the correction data 167a for each color and each spectral wavelength $\lambda i$, the correction accuracy of the spectral sensitivity of the spectroscopic imaging section 137 is improved.

The projective transformation matrix 167b is a transformation matrix for transforming the coordinates set in the liquid crystal panel 115 of the optical modulation device 113 into the coordinates set in the spectroscopic imaged data. The liquid crystal panel 115 has a configuration in which a plurality of pixels are arranged in a matrix. The coordinates set on the liquid crystal panel 115 are coordinates for specifying each of the pixels arranged in this matrix.

The estimation matrix M is a matrix used for estimating the spectrum. The estimation matrix M is generated at the time of manufacturing the projector 100 and is stored in the storage section 160 as a part of the calibration data 167. The estimation matrix M is generated based on the spectroscopic imaged data which is imaged by the spectroscopic imaging section 137. An optical component is mounted on the optical unit 117, and the optical component is also used as a component for guiding the light emitted from the light source 111 to the liquid crystal panel 115 of the optical modulation device 113. Further, in the liquid crystal panel 115 as an optical component, each pixel constituting the liquid crystal panel 115 has a spectral characteristic, and an error occurs in the wavelength of the image light transmitted by the pixels. Due to the optical characteristics of these optical components, an error occurs in the value of the spectroscopic imaged data generated by the spectroscopic imaging section 137, and the color measurement accuracy is lowered. As the calculation method of the correction data 167a, the projective transformation matrix 167b, and the estimation matrix M described above, known methods can be widely applied.

The transformation data 167c in the storage section 160 is data that associates the measurement result of the color obtained from N1 spectroscopic imaged data in the high accuracy mode with the measurement result of the color obtained from N2 spectroscopic imaged data in the high speed mode. Due to the smaller number of data than N1 spectroscopic imaged data or the wide interval of the spectral wavelengths $\lambda i$, when the spectrum of each of the RGB colors is estimated, the error of the N2 spectroscopic imaged data becomes large, and for example, the error of the peak wavelength of each color becomes large. When the error of the peak wavelength of each color becomes large, the measurement accuracy of the absolute value of each color becomes low. In the present embodiment, the transformation data 167c is measured in advance at the time of manufacturing the projector 100, and when the spectrum is estimated from the N2 spectroscopic imaged data, the shift of the peak wavelength and the like of each color is maintained within the allowable range by using the transformation data 167c. As a result, the measurement accuracy of the absolute value of each color and the correction accuracy are improved.

Processor

The processor 170 is, for example, an arithmetic operation processor constituted by a central processing unit (CPU), a digital signal processor (DSP), a microcomputer, and the like. The processor 170 may be configured with a single processor or may be configured with a combination of a plurality of processors. The processor 170 functions as a projection control section 171, an imaging control section 173, an arithmetic operation section 175, and the like by executing the control program 161 stored in the storage section 160.

The projection control section 171 controls the image displayed on the screen SC by the projection section 110. Specifically, the projection control section 171 controls the image processing section 143 to execute image processing with respect to the image data input from the image interface 141. At this time, the projection control section 171 may read the parameter 165 required for the image processing or the OSD menu information from the storage section 160 and output the parameter or information to the image processing section 143. Further, the projection control section 171 is capable of adjusting the luminance of the light source 111 by controlling the light source drive circuit 121.

The imaging control section 173 causes the spectroscopic imaging section 137 to execute imaging. In this case, the imaging control section 173 sets the imaging condition of the high accuracy mode or the high speed mode based on the setting data 164 in the storage section 160. The arithmetic operation section 175 performs arithmetic operation processing for measuring the absolute value of each of the RGB colors or the color unevenness in the projection surface based on the plurality of spectroscopic imaged data output from the spectroscopic imaging section 137. Further, the arithmetic operation section 175 generates a correction parameter 166 for correcting the absolute value of each color or the color unevenness based on the measurement result obtained by the arithmetic operation processing. The image processing section 143 can generate corrected image data in which the absolute value of each color or color unevenness is corrected by using the correction parameter 166 when processing the image data input from the image interface 141.

Operation of Projector

Figure 12:
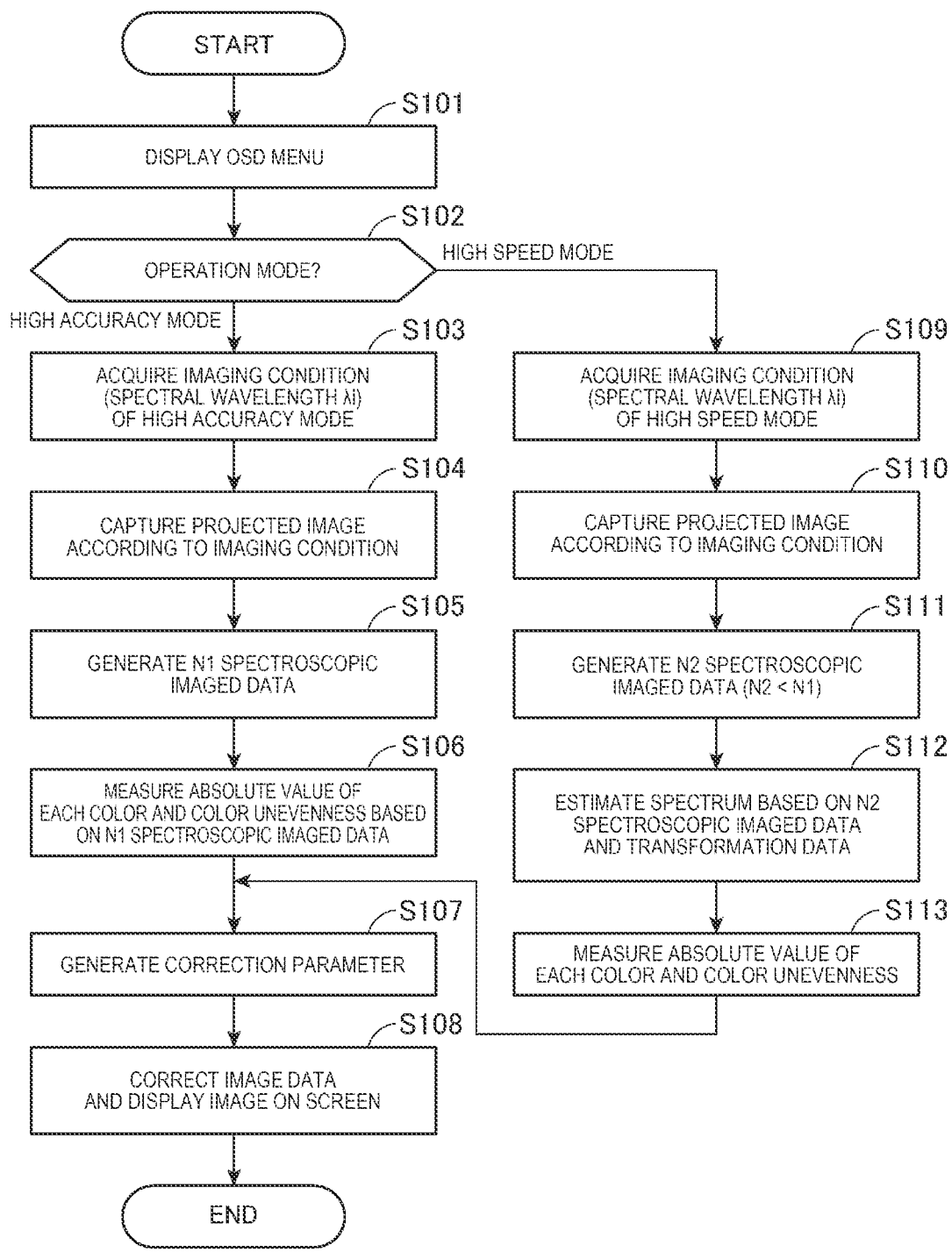
FIG. 12 is a flowchart illustrating an operation of the display system.

FIG. 12 is a flowchart illustrating the operation of the display system 1 related to the measurement/image quality adjustment processing.

When the control section 150 inputs an operation signal corresponding to the display instruction of the OSD menu via the input interface 135, the projection control section 171 displays the OSD menu by performing a process of superimposing the OSD menu on the projected image (step S101). The OSD menu includes a key for instructing the image quality adjustment of the high accuracy mode and a key for instructing the image quality adjustment of the high speed mode, and a user can select the high accuracy mode and the high speed mode by using the OSD menu. The OSD menu or the operation method for selecting the high accuracy mode and the high speed mode may be appropriately changed. For example, each mode may be selectable by using the operation panel 131, the remote controller, or the like.

The image quality adjustment in the present flowchart is to correct the image by using the imaging result of the spectroscopic imaging section 137, and more specifically, correct the absolute value or color unevenness of each of the RGB colors of the projected image to the predetermined condition. The predetermined condition is, for example, a condition corresponding to the image quality at the time of manufacturing.

When the image quality adjustment in the high accuracy mode is instructed (step S102/high accuracy mode), the control section 150 acquires the imaging condition in the high accuracy mode included in the setting data 164 (step S103). Next, the control section 150 performs the imaging processing for capturing the projected image according to the acquired imaging condition (step S104) and generates N1 spectroscopic imaged data (step S105).

In the imaging processing, first, the control section 150 displays the pattern image on the screen SC based on the pattern image data 163 in the storage section 160, and controls the spectroscopic imaging section 137 to capture the pattern image. The data obtained by capturing the pattern image is, for example, data captured by the spectroscopic imaging section 137 in a state where the wavelength is fixed to a predetermined wavelength. Next, the control section 150 calculates the projective transformation matrix 167$b$ indicating the correspondence between the imaging coordinates and the panel coordinates based on the data obtained by capturing the pattern image, and stores the projective transformation matrix 167$b$ in the storage section 160. Next, the control section 150 displays the adjustment image on the screen SC based on the image data 162 for adjustment in the storage section 160 and generates N1 spectroscopic imaged data by making the spectral wavelengths Ai of the spectroscopic imaging section 137 different according to the acquired imaging condition. The N1 spectroscopic imaged data is an example of an "N1 first imaged data" according to the present disclosure.

Subsequently, the control section 150 measures the absolute value of each of the RGB colors and the color unevenness in the projection surface by the arithmetic operation section 175 based on the N1 spectroscopic imaged data (step S106). For example, the spectrum of each color is estimated from N1 spectroscopic imaged data, and the absolute value of each color is acquired from each spectrum. Further, the color unevenness in the projection surface is acquired by detecting the color unevenness (the difference in luminance, the difference in the estimated spectrum, or the like) for each pixel from the spectroscopic imaged data. A known method can be widely applied to the method of measuring the absolute value of each color and the color unevenness.

The control section 150 generates the correction parameter 166 for correcting the measured absolute value of each color and the color unevenness (step S107). The generated correction parameter 166 is stored in the storage section 160. The correction parameter 166 may be a correction parameter in which the pixels constituting the liquid crystal panel 115 are set as one unit or may be a correction parameter in which a plurality of pixels are set as one unit. When the correction parameter 166 with a plurality of pixels as one unit is generated, the correction parameter 166 of the pixel for which the correction parameter 166 is not generated may be obtained by, for example, an interpolation arithmetic operation by linear interpolation.

When the supply of the image signal is started from the image supply device 200, the control section 150 reads the correction parameter 166 from the storage section 160 and outputs the correction parameter 166 to the image processing section 143. When the image interface 141 starts receiving the image signal and the image data is input from the image interface 141, the image processing section 143 loads the input image data into the frame memory 145. The image processing section 143 corrects the image data by using the correction parameter 166 or the like which is input from the control section 150 and displays the image corresponding to the image data on the screen SC (step S108). The supplied image signal is an example of "first image data" according to the present disclosure, and the image data after the correction is an example of "first corrected image data" according to the present disclosure. The projected image corresponding to the image data after the correction is an example of a "first projected image" according to the present disclosure.

In step S102, when the image quality adjustment in the high speed mode is instructed (step S102/high speed mode), the control section 150 acquires the imaging condition in the high speed mode included in the setting data 164 (step S109). Next, the control section 150 performs the imaging processing for capturing the projected image according to the acquired imaging condition (step S110) and generates N2 spectroscopic imaged data (step S111). This imaging processing is the same as the imaging processing in step S104, except that the control of the spectral wavelength $\lambda$i of the spectral element 302 is different. In the case of the high speed mode, the number of spectral wavelengths $\lambda$i is smaller as compared with that in the high accuracy mode, so that the measurement can be completed in a short time. The N2 spectroscopic imaged data is an example of an "N2 second imaged data" according to the present disclosure.

Subsequently, the control section 150 estimates the spectrum from the N2 spectroscopic imaged data by the arithmetic operation section 175 (step S112). In this case, the arithmetic operation section 175 transforms the spectrum of each color obtained from the N2 spectroscopic imaged data into a spectrum equivalent to the spectrum obtained from the N1 spectroscopic imaged data based on the transformation data 167$c$ in the storage section 160. As a result, a spectrum in which the peak wavelength of each color is positioned at substantially the same wavelength as the spectrum obtained from the N1 spectroscopic imaged data is estimated.

The control section 150 measures the absolute value of each color and the color unevenness in the projection surface based on the N2 spectroscopic imaged data (step S113). For example, the absolute value of each color is acquired from the spectrum estimated in step S112. Further, the color unevenness in the projection surface is acquired by detecting the color unevenness (difference in luminance or the like) for each pixel from the spectroscopic imaged data. A known method can be widely applied to the method of measuring the absolute value of each color and the color unevenness.

When the control section 150 measures the absolute value of each color and the color unevenness in the projection surface based on the N2 spectroscopic imaged data, the processes in steps S107 and S108 are executed. As a result, the control section 150 generates a correction parameter 166 for correcting the measured absolute value of each color and color unevenness, corrects the image data by using the correction parameter 166, and displays the image corresponding to the image data after the correction on the screen SC. The image data after the correction is an example of "second corrected image data" according to the present disclosure, and the projected image corresponding to the image data after the correction is an example of a "second projected image" according to the present disclosure.

As described above, when the display system 1 of the second embodiment is in the high accuracy mode, the spectroscopic imaging section 137 including the imaging element 303 and the spectral element 302, generates the N1 spectroscopic imaged data obtained by capturing the projected image by making the spectral wavelengths of the spectral element 302 different. Based on the N1 spectroscopic imaged data, the projector 100 generates the image data after the correction in which the input image data is corrected. The projector 100 generates a projected image based on the image data after the correction and projects the projected image on the screen SC which is a projection surface.

On the other hand, when the display system 1 is in the high speed mode, the spectroscopic imaging section 137 generates N2 spectroscopic imaged data obtained by capturing the projected image by making the spectral wavelengths of the spectral element 302 different. Based on the N2 spectroscopic imaged data, the projector 100 generates the image data after the correction in which the input image data is corrected. The projector 100 generates a projected image based on the image data after the correction and projects the projected image on the screen SC.

As described above, N1 is an integer greater than or equal to two, and N2 is an integer less than N1. Therefore, when rigorous image quality adjustment is desired or when image quality is important such as for theater applications, it can be handled in high accuracy mode. On the other hand, when a simple check is to be performed, the image quality can be checked in a shorter time than in the high accuracy mode by setting a mode to the high speed mode. Therefore, the user convenience is improved in adjusting and checking the image quality. A case where a simple check is desired to be performed means, for example, a case where an abnormal projection presence/absence check, particularly, a short time check between projections is desired to be performed or a case where a checking is desired to be performed in cases where image quality is not relatively important, such as in offices and educational settings.

Further, in case of the high accuracy mode, predetermined information related to color is measured based on N1 first imaged data (spectroscopic imaged data), and data obtained by correcting the input image data based on the measurement result is defined as the imaged data after the correction. In the present embodiment, the predetermined information related to the color indicates the absolute value of each of the RGB colors and the color unevenness in the projection surface, but either one may be used or information for detecting dirt due to stains, deposits, or the like may be used, and appropriate information can be applied. As a result, the image quality adjustment related to the color can be performed by using the spectral element 302.

The transformation data 167c is acquired in advance that associates the spectrum result of the color obtained from the N1 spectroscopic imaged data in the high accuracy mode with the spectrum result of the color obtained from the N2 spectroscopic imaged data in the high speed mode. In the case of the high speed mode, the spectrum result of the color obtained from the N2 spectroscopic imaged data is transformed into information corresponding to the spectrum result of the color obtained from the N1 spectroscopic imaged data based on the transformation data 167c. The data obtained by correcting the image data input based on the information after the transformation is used as the image data after the correction. As a result, the shift or the like of the peak wavelength of each color that occurs when the spectrum is estimated using only a relatively small number of spectroscopic imaged data is set within the allowable range, the measurement accuracy is sufficiently maintained, and thus it is possible to perform the appropriate correction.

Further, since the projector 100 projects a projected image including an OSD menu that includes options of the high accuracy mode and the high speed mode, it becomes easy to select each mode. As a result, the number of switches can be reduced as compared with the case where the switch for selecting each mode is provided on the operation panel 131 or the remote controller, and the existing operation panel or remote controller can be easily used.

Further, the spectral element 302 has a pair of reflective films 304 and 305 and a gap changing section 306 capable of changing the gap dimensions of the pair of reflective films 304 and 305 and is a variable wavelength interference filter that is disposed on the optical path of the light incident on the imaging element 303. In this way, compared with the wavelength dispersive type, it becomes easier to perform high accuracy measurement and short-time measurement while maintaining high resolution. Although the case where two operation modes configured with the high accuracy mode and the high speed mode are provided is illustrated, operation modes with different imaging conditions such as the number of spectral wavelengths λi, and exposure time, or the like may be added, and the number of operation modes may be three or more.

For example, in the example in FIG. 11, the case where the S/N ratio of the measured value is increased and the measurement reproducibility is increased by making the exposure time the same as the high accuracy mode even in the high speed mode is illustrated, but the present disclosure is not limited to this. The exposure time may be shorter than that of in the high accuracy mode, and another high speed mode with a shorter measurement time may be further provided. When the high speed mode illustrated in FIG. 11 is described as the second mode, another high speed mode may be described as a third mode. Further, the high speed mode illustrated in FIG. 11 may be omitted, and the other high speed mode may be used as an example of the "second mode" according to the present disclosure.

Figure 13:
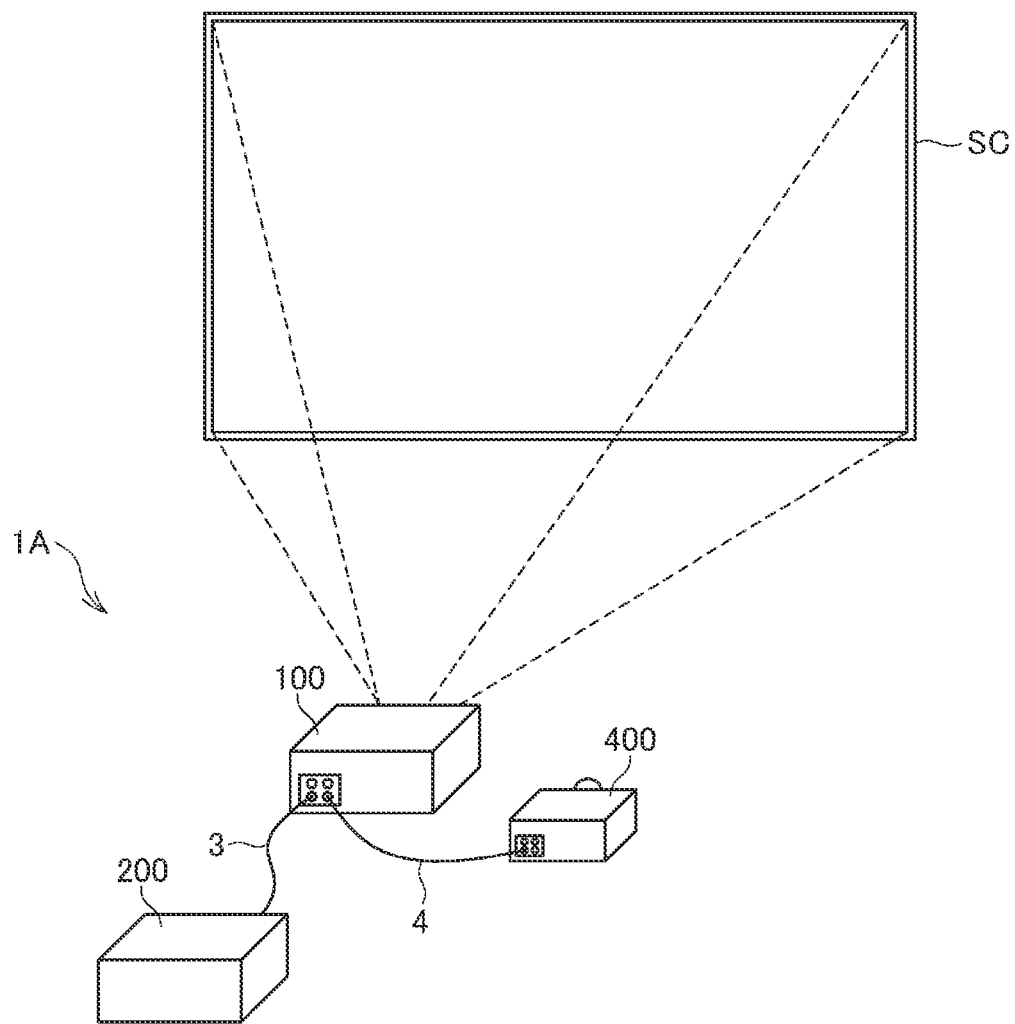
FIG. 13 is a diagram in which a configuration of the display system is changed.

In the second embodiment, a case where a configuration corresponding to a spectroscopic imaging device is integrally provided with the projector 100 has been illustrated, but as illustrated in FIG. 13, a display system 1A may include a spectroscopic imaging device 400 that is separate from the projector 100. Further, although FIG. 13 illustrates a case where the projector 100 and the spectroscopic imaging device 400 are coupled by wire using a cable 4, but the projector 100 and the spectroscopic imaging device 400 may be wirelessly coupled using wireless communication.

Third Embodiment

FIG. 14 is a diagram illustrating a display system 1 according to a third embodiment.

In the third embodiment, two projectors 100 are coupled by a cable 5, data communication is performed between the projectors 100, and the color matching of the images displayed on the screen SC by each projector 100 is performed. The projector 100 that displays an image on the left side of the screen SC when viewed from the direction facing the screen SC is referred to as a projector 100A, and the projector 100 that displays an image on the right side of the screen SC is referred to as a projector 100B. The number of projectors 100 coupled is not limited to two and may be three or more. Instead of the wired connection using the cable 3, a wireless connection using wireless communication may be used.

Since the configurations of the projector 100A and the projector 100B are the same as the configurations of the projector 100 illustrated in FIG. 9, the illustration is omitted. Hereinafter, for convenience of explanation, components of the projector 100A are indicated by adding reference numerals "A" to the components in FIG. 9 corresponding to the components of the projector 100A, and components of the projector 100B are indicated by adding reference numerals "B" to the components in FIG. 9 corresponding to the components of the projector 100B. For example, the control section 150 of the projector 100A is referred to as a "control section 150A", and the control section 150 of the projector 100B is referred to as a "control section 150B". The projector 100A and the projector 100B are each coupled to the image supply device 200 via the cable 3, and an image based on the image signal supplied from the image supply device 200 is displayed on the screen SC.

The projector 100A operates as a master machine, and the projector 100B operates as a slave machine. That is, the projector 100B operates according to the control of the projector 100A. The projector 100A, which is a master machine, instructs the projector 100B to calculate each value necessary for generating the correction parameter 166 and instructs the projector 100B to perform the image processing using the correction parameter 166.

A region on which the projector 100A projects the image light is referred to as a "projection region 20A", and a region on which the projector 100B projects the image light is referred to as a "projection region 20B". A part of the region overlaps in the projection region 20A and the projection region 20B.

In the third embodiment, the projector 100A has a function of receiving color matching between the projectors 100A and 100B coupled to each other. For example, the control section 150A causes the projection control section 171A to display an OSD menu including a key for instructing the color matching, and receives a color matching instruction from a user. In this case, the control section 150A displays the key for instructing color matching in the high accuracy mode and the key for instructing color matching in the high speed mode as keys for instructing color matching. The key for instructing the color matching in the high accuracy mode is an example of a "key for instructing image quality adjustment in high accuracy mode", and the key for instructing the color matching in the high speed mode is an example of a "key for instructing image quality adjustment in high speed mode".

When the color matching in the high accuracy mode is instructed, the control section 150A causes each of the control sections 150A and 150B to execute the processes in steps S103 to S107 illustrated in FIG. 12. As a result, a correction parameter 166A of the projector 100A and a correction parameter 166B of the projector 100B are generated. As a result, the correction parameters 166A and 166B corresponding to the correction parameter 166 in case of the high accuracy mode of the second embodiment are generated. In this case, in the projector 100B, a spectroscopic imaging section 137B may perform only the processing related to imaging corresponding to steps S103 to S105 in FIG. 12, and transmit the N1 spectroscopic imaged data obtained by the imaging to the projector 100A. In this case, in the projector 100A, the correction parameter 166B of the projector 100B is generated by performing the processing of the remaining steps S106 to S107 using the spectroscopic imaged data transmitted from the projector 100B.

The control section 150A corrects the image data input to each of the projectors 100A and 100B by using the correction parameters 166A and 166B and displays the image corresponding to the image data after the correction on the screen SC. As a result, the color matching is performed for each of the projected images of the projectors 100A and 100B. The correction parameters 166A and 166B correct the absolute value of each color and color unevenness of each of the projectors 100A and 100B, but other correction methods capable of aligning the colors of the projectors 100A and 100B may be used.

For example, the control section 150A acquires N1 spectroscopic imaged data obtained by a spectroscopic imaging section 137A of the projector 100A and N1 spectroscopic imaged data obtained by the spectroscopic imaging section 137B of the projector 100B. Next, the control section 150A measures a color difference between the projectors 100A and 100B based on the acquired spectroscopic imaged data. Subsequently, the control section 150A may generate the correction parameter for correcting the color displayed by the projector 100B to the color of the projector 100A based on the measurement result.

When the color matching in the high speed mode is instructed, the control section 150A causes each of the control sections 150A and 150B to sequentially execute the processes in steps S109 to S113, S107, and S108 illustrated in FIG. 12. As a result, the correction parameter 166A of the projector 100A and the correction parameter 166B of the projector 100B are generated. As a result, the parameters 166A and 166B corresponding to the correction parameter 166 in the case of the high speed mode of the second embodiment are generated. In this case, in the projector 100B, the spectroscopic imaging section 137B may perform only the processing related to imaging corresponding to steps S109 to S111 in FIG. 12, and transmit the N2 spectroscopic imaged data obtained by the imaging to the projector 100A. In this case, in the projector 100A, the correction parameter 166B of the projector 100B is generated by performing the processing of the remaining steps S112 to S113 and S107 using the spectroscopic imaged data transmitted from the projector 100B.

Even in the case of the high speed mode, the control section 150A may measure the color difference between the projectors 100A and 100B and generate the correction parameter for correcting the color displayed by the projector 100B to the color of the projector 100A based on the measurement result. In this case, compared to the case of adopting the high speed mode for generating the correction parameters 166A and 166B used for correcting the absolute value of each color and color unevenness of the projectors 100A and 100B, the time required to generate the correction parameters can be reduced, and it is possible to shorten the time in the high speed mode.

That is, when the display system 1 of the third embodiment is in the high accuracy mode, each of the spectroscopic imaging sections 137A and 137B generates N1 spectroscopic imaged data obtained by capturing each of the projected images of the projectors 100A and 100B by making the spectral wavelengths different. Next, with either projector 100A or 100B, each of the image data after the correction obtained by correcting the image data input based on N1 spectroscopic imaged data is generated. The N1 spectroscopic imaged data is an example of "N1 first imaged data" according to the present disclosure, and the input image data is an example of "first image data" according to the present disclosure. The image data after the correction is an example of "first corrected image data" according to the present disclosure.

Next, the projectors 100A and 100B project the projected image based on the image data after the correction onto the screen SC which is the projection surface, respectively. The projected image is an example of a "first projected image" according to the present disclosure.

On the other hand, when the display system 1 is in the high speed mode, each of the spectroscopic imaging sections 137A and 137B generates N2 spectroscopic imaged data obtained by capturing each of the projected images of the projectors 100A and 100B by making the spectral wavelengths different. Next, with either projector 100A or 100B, each of the image data after the correction obtained by correcting the image data input based on N2 spectroscopic imaged data is generated. Next, the projectors 100A and 100B project the projected image based on the image data after the correction onto the screen SC which is the projection surface, respectively. The N2 spectroscopic imaged data is an example of "N2 second imaged data" according to the present disclosure, the image data after the correction is an example of "second corrected image data" according to the present disclosure, and the projected image is an example of a "second projected image" according to the present disclosure.

Figure 15:
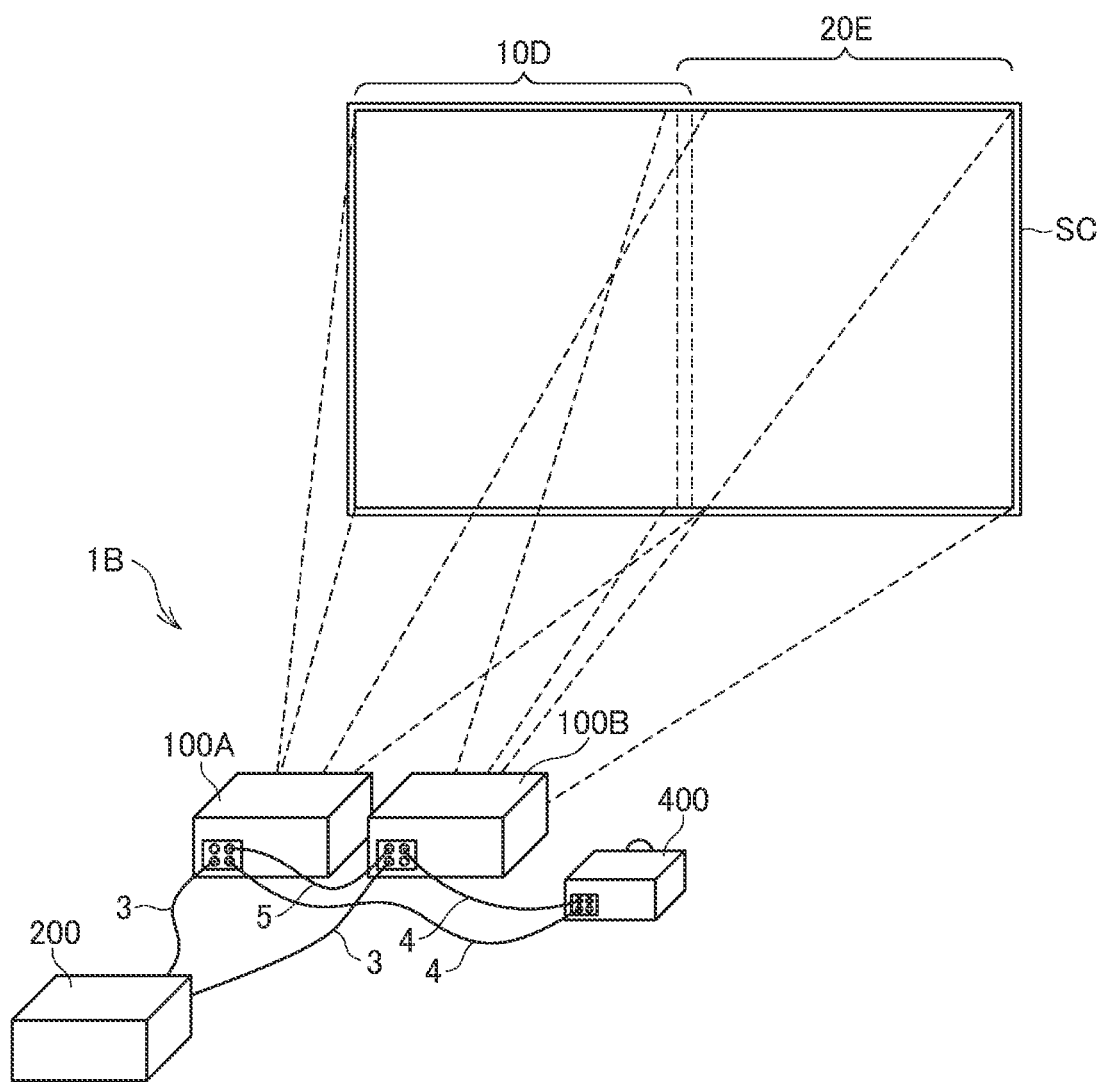
FIG. 15 is a diagram in which a configuration of the display system is changed.

In this way, the high accuracy mode can be used when the rigorous color matching is performed for each of the projectors 100A and 100B or when the image quality is important such as for theater applications. On the other hand, when a simple check is to be performed, the image quality can be checked in a shorter time than in the high accuracy mode by setting a mode to the high speed mode. Therefore, the user convenience is improved in adjusting and checking the image quality when a plurality of projectors 100 are used. The configuration corresponding to the spectroscopic imaging device does not have to be limited to the configuration provided in each of the projectors 100A and 100B, for example, only one of the projectors 100A and 100B may be provided with a configuration corresponding to the spectroscopic imaging device. Further, as illustrated in FIG. 15, a display system 1B may include a spectroscopic imaging device 400 that is separate from the projectors 100A and 100B, and the spectroscopic imaging device 400 may capture the projected images of the projectors 100A and 100B.

The present disclosure is not limited to the configuration of each of the above embodiments and can be implemented in various aspects without departing from the spirit thereof.

In each of the above embodiments, the case where the present disclosure is applied to the display systems 1, 1A, the projectors 100, 100A, 100B, and the control methods thereof illustrated in FIG. 9 and the like has been described, but the present disclosure is not limited thereto. For example, the case of correcting at least one of the absolute value of each of the RGB colors, the color unevenness in the projection surface, and the color between a plurality of projectors 100 has been illustrated, but the measurement target and the correction target may be appropriately changed. Further, although the case where the measurement target light is visible light is illustrated, it may be other than visible light, for example, infrared rays or far infrared rays. Further, although the case where the variable wavelength interference filter is used for the spectral element 302 has been described, another wavelength scanning type filter may be used.

Further, either a transmissive type liquid crystal panel or a reflective type liquid crystal panel may be applied to the three liquid crystal panels 115 included in the optical modulation device 113. Further, instead of the three liquid crystal panels 115, a configuration in which one liquid crystal panel and a color wheel are combined may be applied. Various known methods such as a method using three digital mirror devices (DMD) and a DMD method combining one digital mirror device and a color wheel may be applied to the optical modulation device 113.

Further, the configuration of each part illustrated in FIG. 9 and the like may be realized by hardware or may be a configuration realized by collaboration between hardware and software, and it is not limited to the configuration in which independent hardware resources are disposed as illustrated in the figure.

Further, the processing unit of the flowchart illustrated in FIG. 12 is a division of the processing by the control section 150 according to the main processing contents. The embodiment is not limited by the method or name of the division of the processing unit of each flowchart. Further, the processing order of the above flowchart is not limited to the illustrated example.

Further, the control program 161 may be stored in an external device or device and acquired via the communication section 139 or the like. It is also possible to record on a recording medium that is readable by a computer. As the recording medium, a magnetic or optical recording medium, or a semiconductor memory device can be used. Specifically, examples thereof include portable or fixed recording media such as flexible disks, various optical disks, magneto-optical disks, flash memories, and card-type recording media. Further, the recording medium may be a non-volatile storage device such as RAM, ROM, or HDD, which is an internal storage device included in the image display device.

What is claimed is:

1. A control method of a spectroscopic imaging device including an imaging element and a spectral element, the control method comprising:

causing the spectroscopic imaging device to generate a first measurement spectrum consisting of N1 wavelengths by imaging a target object by making output wavelengths of the spectral element different when the spectroscopic imaging device is in a first mode;

causing the spectroscopic imaging device to derive a spectrum of the target object based on the first measurement spectrum;

causing the spectroscopic imaging device to generate a second measurement spectrum consisting of N2 wavelengths by imaging the target object by making the output wavelengths of the spectral element different when the spectroscopic imaging device is in a second mode, wherein N1 is an integer greater than or equal to two, and N2 is a positive integer less than N1; and causing the spectroscopic imaging device to derive the spectrum of the target object in the second mode by estimating the first measurement spectrum consisting of the N1 wavelengths from the second measurement spectrum consisting of the N2 wavelengths using transformation data, wherein the transformation data is a matrix that approximates the first measurement spectrum consisting of the N1 wavelengths, and deriving the spectrum of the target object based on the estimated first measurement spectrum.

2. The control method of a spectroscopic imaging device according to claim 1, wherein the spectrum of the target object has the first measurement spectrum obtained in the first mode and the second measurement spectrum obtained in the second mode, and intervals of the output wavelengths are made different based on at least one of the first measurement spectrum and the second measurement spectrum.

3. The control method of a spectroscopic imaging device according to claim 1, wherein the spectral element has a pair of reflective films and a gap changing section configured to change gap dimensions of the pair of reflective films and is a variable wavelength interference filter disposed on an optical path of light incident on the imaging element.

4. A spectroscopic imaging device comprising:

an imaging element;

a spectral element; and one or more processors, wherein the one or more processors are configured to perform causing the spectroscopic imaging device to generate a first measurement spectrum consisting of N1 wavelengths by imaging a target object by making output wavelengths of the spectral element different when the spectroscopic imaging device is in a first mode, causing the spectroscopic imaging device to derive a spectrum of the target object based on the first measurement spectrum, causing the spectroscopic imaging device to generate a second measurement spectrum consisting of N2 wavelengths by imaging the target object by making the output wavelengths of the spectral element different when the spectroscopic imaging device is in a second mode, wherein N1 is an integer greater than or equal to two, and N2 is a positive integer less than N1, and causing the spectroscopic imaging device to derive the spectrum of the target object in the second mode by estimating the first measurement spectrum consisting of the N1 wavelengths from the second measurement spectrum consisting of the N2 wavelengths using transformation data, wherein the transformation data is a matrix that approximates the first measurement spectrum consisting of the N1 wavelengths, and deriving the spectrum of the target object based on the estimated first measurement spectrum.

5. A non-transitory computer-readable storage medium storing a program for specifying a target object based on captured data obtained by a spectroscopic imaging device that includes an imaging element and a spectral element, wherein the program causes one or more processors to execute generating a first measurement spectrum consisting of N1 wavelengths, in which N1 is an integer greater than or equal to two, by imaging the target object by making output wavelengths of the spectral element different by using the imaging element when the spectroscopic imaging device is in a first mode of the spectroscopic imaging device, deriving a spectrum of the target object based on the first measurement spectrum, generating a second measurement spectrum consisting of N2 wavelengths, in which N2 is a positive integer less than N1, by imaging the target object by making the output wavelengths of the spectral element different by using the imaging element when the spectroscopic imaging device is in a second mode of the spectroscopic imaging device, and deriving the spectrum of the target object in the second mode by estimating the first measurement spectrum consisting of the N1 wavelengths from the second measurement spectrum consisting of the N2 wavelengths using transformation data, wherein the transformation data is a matrix that approximates the first measurement spectrum consisting of the N1 wavelengths, and deriving the spectrum of the target object based on the estimated first measurement spectrum.

6. A control method of a display system including a spectroscopic imaging device that includes an imaging element and a spectral element, and a projector that projects a projected image based on image data onto a projection surface, the control method comprising:

causing the spectroscopic imaging device to generate N1 first imaged data obtained by capturing the projected image by making spectral wavelengths of the spectral element different when the display system is in a first mode;

causing the projector to generate first corrected image data obtained by correcting first image data based on the N1 first imaged data;

causing the projector to project a first projected image based on the first corrected image data onto the projection surface;

causing the spectroscopic imaging device to generate N2 second imaged data obtained by capturing the projected image by making the spectral wavelengths of the spectral element different when the display system is in a second mode;

causing the projector to generate second corrected image data obtained by correcting the first image data based on the N2 second imaged data; and causing the projector to project a second projected image based on the second corrected image data onto the projection surface, wherein N1 is an integer greater than or equal to two, and N2 is a positive integer less than N1.

7. The control method of a display system according to claim 6, wherein data obtained by measuring predetermined information related to colors based on the N1 first imaged data and correcting the first image data based on the measurement result is the first corrected image data.

8. The control method of a display system according to claim 7, further comprising:

acquiring transformation data in advance that associates a predetermined measurement result of colors obtained from the N1 first imaged data in the first mode with a predetermined measurement result of colors obtained from the N2 second imaged data in the second mode; and transforming the predetermined measurement result obtained from the N2 second imaged data in the second mode into information corresponding to the predetermined measurement result obtained from the N1 first imaged data based on the transformation data, and using data obtained by correcting the first image data based on the information after the transformation as the second corrected image data.

9. The control method of a display system according to claim 6, wherein
the projected image including an OSD menu that includes an option of the first mode and the second mode is projected by the projector.

10. The control method of a display system according to claim 6, wherein:
the spectral element has a pair of reflective films and a gap changing section configured to change gap dimensions of the pair of reflective films and is a variable wavelength interference filter disposed on an optical path of light incident on the imaging element.

11. A control method of a projector that projects a projected image based on image data onto a projection surface, the control method comprising:
causing a spectroscopic imaging device to acquire N1 first imaged data obtained by capturing the projected image by making spectral wavelengths of a spectral element of the spectroscopic imaging device different when the projector is in a first mode;
generating first corrected image data obtained by correcting first image data based on the N1 first imaged data;
projecting a first projected image based on the first corrected image data onto the projection surface;
causing the spectroscopic imaging device to acquire N2 second imaged data obtained by capturing the projected image by making the spectral wavelengths of the spectral element of the spectroscopic imaging device different when the projector is in a second mode;
generating second corrected image data obtained by correcting the first image data based on the N2 second imaged data; and
projecting a second projected image based on the second corrected image data onto the projection surface, wherein
N1 is an integer greater than or equal to two, and N2 is a positive integer less than N1.

12. A display system comprising:
a spectroscopic imaging device including an imaging element and a spectral element;
a projector projecting a projected image based on image data onto a projection surface; and
one or more processors, wherein
the one or more processors are configured to execute
causing the spectroscopic imaging device to generate N1 first imaged data obtained by capturing the projected image by making spectral wavelengths of the spectral element different when the display system is in a first mode;
causing the projector to generate first corrected image data obtained by correcting first image data based on the N1 first imaged data and project a first projected image based on the first corrected image data onto the projection surface;
causing the spectroscopic imaging device to generate N2 second imaged data obtained by capturing the projected image by making the spectral wavelengths of the spectral element different when the display system is in a second mode; and
causing the projector to generate second corrected image data obtained by correcting the first image data based on the N2 second imaged data and project a second projected image based on the second corrected image data onto the projection surface, wherein
N1 is an integer greater than or equal to two, and N2 is an integer less than N1.

13. A projector that projects a projected image based on image data onto a projection surface, the projector comprising:
one or more processors configured to perform
causing a spectroscopic imaging device to acquire N1 first imaged data obtained by capturing the projected image by making spectral wavelengths of a spectral element of the spectroscopic imaging device different when the projector is in a first mode;
generating first corrected image data obtained by correcting first image data based on the N1 first imaged data;
projecting a first projected image based on the first corrected image data onto the projection surface;
causing the spectroscopic imaging device to acquire N2 second imaged data obtained by capturing the projected image by making the spectral wavelengths of the spectral element of the spectroscopic imaging device different when the projector is in a second mode;
generating second corrected image data obtained by correcting the first image data based on the N2 second imaged data; and
projecting a second projected image based on the second corrected image data onto the projection surface, wherein
N1 is an integer greater than or equal to two, and N2 is a positive integer less than N1.

* * * * *